US008473988B2

(12) United States Patent  
Ohta et al.

(10) Patent No.: US 8,473,988 B2
(45) Date of Patent: Jun. 25, 2013

(54) DISPLAY APPARATUS AND DISPLAY METHOD

(75) Inventors: Masatoshi Ohta, Tokyo (JP); Junya Ohde, Ibaraki (JP)

(73) Assignee: Sony Corporation (JP)

( * ) Notice: Subject to any disclaimer, the term of this patent is extended or adjusted under 35 U.S.C. 154(b) by 457 days.

(21) Appl. No.: 12/462,418

(22) Filed: Aug. 4, 2009

(65) Prior Publication Data

US 2010/0037261 A1  Feb. 11, 2010

(30) Foreign Application Priority Data

Aug. 7, 2008  (JP) ................ P2008-204743

(51) Int. Cl.
G06F 3/00 (2006.01)
G06F 13/00 (2006.01)
G06F 3/048 (2006.01)
H04N 5/445 (2011.01)

(52) U.S. Cl.
USPC ............ 725/58; 725/37; 725/39; 725/52; 715/700; 715/764; 715/810; 715/835

(58) Field of Classification Search
None
See application file for complete search history.

(56) References Cited

U.S. PATENT DOCUMENTS

| | | | |
|---|---|---|---|
| 6,359,636 B1* | 3/2002 | Schindler et al. | 715/846 |
| 2002/0049978 A1* | 4/2002 | Rodriguez et al. | 725/86 |
| 2004/0095268 A1 | 5/2004 | Miyazaki | |
| 2004/0218104 A1 | 11/2004 | Smith et al. | |
| 2005/0193350 A1 | 9/2005 | Ishiguro et al. | |
| 2006/0164386 A1* | 7/2006 | Smith et al. | 345/156 |
| 2007/0032992 A1* | 2/2007 | Trowbridge et al. | 702/193 |
| 2010/0122194 A1* | 5/2010 | Rogers | 715/769 |
| 2010/0175090 A1* | 7/2010 | Cordray | 725/58 |

FOREIGN PATENT DOCUMENTS

| | | |
|---|---|---|
| JP | 10-188390 A | 7/1998 |
| JP | 2000-270276 A | 9/2000 |
| JP | 2002-259004 A | 9/2002 |
| JP | 2004104714 A | 4/2004 |
| JP | 2004-173003 A | 6/2004 |
| JP | 2004336597 A | 11/2004 |
| JP | 2005-012433 A | 1/2005 |
| JP | 2005045744 A | 2/2005 |

(Continued)

OTHER PUBLICATIONS

European Search Report, EP 09167354, dated Oct. 9, 2009.

(Continued)

*Primary Examiner* — Chris Parry
*Assistant Examiner* — Omar S Parra
(74) *Attorney, Agent, or Firm* — Lerner, David, Littenberg, Krumholz & Mentlik, LLP

(57) ABSTRACT

There is provided a display apparatus including display means for displaying images, electronic program guide display means for causing the display means to display an electronic program guide, selection means for draggably & droppably selecting the part of the electronic program guide displayed by the electronic program guide display means, icon display means for, when the part selected by the selection means is dragged, causing icons corresponding to the part to be displayed by being superimposed on the electronic program guide, and execution means for, when the part is dropped onto the icon caused by the icon display means to be displayed by being superimposed on the electronic program guide while the part displayed in the electronic program guide being dragged by the selection means, causing a function associated with the icon to be executed.

11 Claims, 22 Drawing Sheets

FOREIGN PATENT DOCUMENTS

| | | | |
|---|---|---|---|
| JP | 2005-242731 | A | 9/2005 |
| JP | 2006-229792 | A | 8/2006 |
| JP | 2006203381 | A | 8/2006 |
| JP | 2007-213240 | A | 8/2007 |
| JP | 2007-329531 | A | 12/2007 |
| JP | 2008097466 | A | 4/2008 |
| WO | 02/103470 | A2 | 12/2002 |
| WO | 2007039787 | A1 | 4/2007 |
| WO | WO 2007036762 | A1 * | 4/2007 |

OTHER PUBLICATIONS

Office Action from Japanese Application No. 2008-204743, dated Apr. 20, 2010.
Office Action from Japanese Application No. 2008-204743, dated Jul. 13, 2010.

* cited by examiner

DISPLAY APPARATUS AND DISPLAY METHOD

CROSS-REFERENCE TO RELATED APPLICATION

The present application claims priority from Japanese Patent Application No. JP 2008-204743 filed in the Japanese Patent Office on Aug. 7, 2008, the entire content of which is incorporated herein by reference.

BACKGROUND OF THE INVENTION

1. Field of the Invention

The present invention relates to a display apparatus and a display method, and in particular, relates to a display apparatus that displays an electronic program guide in a screen and a display method.

2. Description of the Related Art

Among TV sets and other display apparatuses that receive and display analog broadcasting or digital broadcasting, those having a function to receive EPG (Electronic Program Guide) data transmitted together with broadcast waves to display an electronic program guide in the screen based on the received EPG data have been widespread.

When an electronic program guide displayed in the screen is made to display a detailed description of a program or viewing or recording of a program is set, up/down and right/left cursor keys arranged in a remote controller, a menu button to display a menu, or a decision button to perform an operation to a selected program is generally used in the past. However, if cursor keys are used to perform an operation on a specific program, it takes time for the operation because it is necessary to first select a program using cursor keys, further press the decision button or the like to display a menu, and then select an item using the cursor keys again from the separately displayed menu.

In such a program guide, it is difficult to perform intuitive operations or consistent operations when an operation that is not directly related to a program focused by an operation of the cursor keys. When, for example, a program is set for recording, a procedure of selecting the program by the cursor keys and then, opening a submenu by a menu button and selecting "Reservation" from the submenu by pressing the decision button is generally followed. In such a case, when programs matching specific conditions are retrieved, a procedure of first pressing the menu button to open the option menu, selecting "Search" from the option menu by pressing the decision button, and then, search conditions are set is followed, making operation procedures inconsistent.

In order to solve such an issue, instead of an operation by the cursor keys, an operation of a program guide by a remote controller of a so-called free cursor capable of freely operating the cursor is proposed (See, for example, Japanese Patent Application Laid-Open No. 10-188390, Japanese Patent Application Laid-Open No. 2000-270276, Japanese Patent Application Laid-Open No. 2007-213240, Japanese Patent Application Laid-Open No. 2005-242731, Japanese Patent Application Laid-Open No. 2002-259004, Japanese Patent Application Laid-Open No. 2005-12433, and Japanese Patent Application Laid-Open No. 2007-329531). Also a technique to operate a program guide by allocating specific operations to gestures of the user using a remote controller into which a device such as a gyro-sensor is incorporated (See Japanese Patent Application Laid-Open No. 2004-173003) and a technique to drag and drop an icon (such as an icon for a viewing setting operation or recording setting operation) in the screen onto each program in a program guide (See Japanese Patent Application Laid-Open No. 2006-229792) are proposed.

SUMMARY OF THE INVENTION

However, even if the program guide is adapted to the free cursor, it is necessary to select items from menus or icons displayed at fixed positions to perform a program related operation so that it is difficult to perform the operation quickly. Particularly, when the method of arranging a plurality of operation icons in the screen in advance is used, many small operation icons will be displayed due to restrictions of the screen space and there is an issue that it is necessary to finely position a free cursor when the free cursor is used for pointing.

In the technique to operate a program guide by allocating specific operations to gestures of a remote controller from the user using the remote controller into which a device such as a gyro-sensor is incorporated, there is an issue that it is difficult to find timing of starting gesture input to typically accept gesture input, leading to an operation error. Moreover, it is difficult to allocate gestures to all available functions in the program guide one by one and thus, the user is under the constraint that only specific operations can be performed by gesture input.

Further, in the technique to drag and drop an operation icon in the screen onto each program displayed in a program guide, there is an issue that an operation error such as dropping an icon onto a different program erroneously is more likely to occur when the operation icon is dropped onto a program displayed small in the program guide.

The present invention has been made in view of the above issues and it is desirable to provide a novel and improved display apparatus and display method capable of performing an easy operation on an electronic program guide by causing icons related to a part displayed in the electronic program guide to be displayed in a form superimposed on the electronic program guide when the part is dragged and dropping the dragged part onto the displayed icons.

According to an embodiment of the present invention, there is provided a display apparatus, including: display means for displaying images; electronic program guide display means for causing the display means to display an electronic program guide in a state in which parts are combined; selection means for draggably & droppably selecting the part of the electronic program guide displayed by the electronic program guide display means; icon display means for, when the part selected by the selection means is dragged, causing icons corresponding to the part to be displayed by being superimposed on the electronic program guide; and execution means for, when the part is dropped onto the icon caused by the icon display means to be displayed by being superimposed on the electronic program guide while the part displayed in the electronic program guide being dragged by the selection means, causing a function associated with the icon to be executed.

According to the above configuration, the display means displays images and the electronic program guide display means causes the display means to display an electronic program guide in a state in which parts are combined. The selection means draggably & droppably selects the part of the electronic program guide displayed by the electronic program guide display means and, when the part selected by the selection means is dragged, the icon display means causes icons corresponding to the part to be displayed by being superimposed on the electronic program guide. When the part is dropped onto the icon caused by the icon display means to be displayed by being superimposed on the electronic program guide while the part displayed in the electronic program guide being dragged by the selection means, the execution means causes a function associated with the icon to be executed. As a result, an easy operation on an electronic program guide can be performed by causing icons related to a part displayed in the electronic program guide to be displayed in a form superimposed on the electronic program guide when the part is dragged and dropping the dragged part onto the displayed icons.

The selection means may move over the electronic program guide in accordance with movement of a remote control device.

If the selection means moves by drawing a predetermined trajectory while the part of the electronic program guide being dragged by the selection means, the execution means may cause the function corresponding to the trajectory to be executed.

The selection means may select a plurality of parts of the electronic program guide simultaneously.

The icon display means may decide icons to be displayed by being superimposed on the electronic program guide by using an execution history of the execution means.

If icons caused to be displayed are not held in the display means, the icon display means may cause the display means to display icons in descending order of priority. Further, the icon display means may decide the priority by using an execution history of the execution means.

According to another embodiment of the present invention, there is provided a display method including the steps of: causing display means for displaying images to display an electronic program guide in a state in which parts are combined; selecting draggably & droppably the part of the electronic program guide displayed in the electronic program guide display step; causing, when the part selected in the selection step is dragged, icons corresponding to the part to be displayed by being superimposed on the electronic program guide; and causing, when the part is dropped onto the icon caused by the icon display step to be displayed by being superimposed on the electronic program guide while the part displayed in the electronic program guide being dragged by the selection step, a function associated with the icon to be executed.

According to the present invention, as described above, a novel and improved display apparatus and display method capable of performing an easy operation on an electronic program guide by causing icons related to a part displayed in the electronic program guide to be displayed in a form superimposed on the electronic program guide when the part is dragged and dropping the dragged part onto the displayed icons can be provided.

DETAILED DESCRIPTION OF THE PREFERRED EMBODIMENTS

Figure 1:
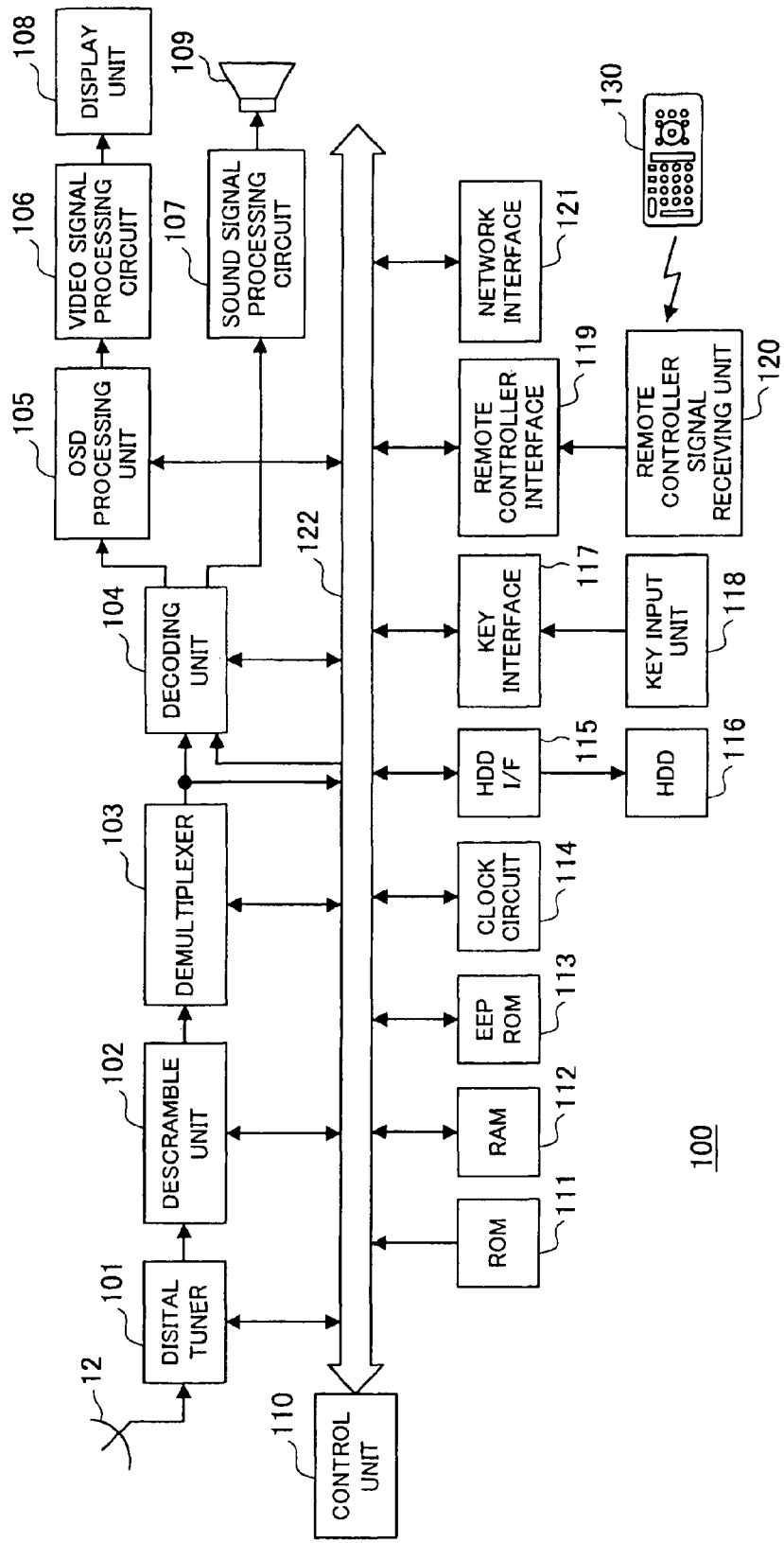
FIG. 1 is an explanatory view illustrating the configuration of a display apparatus 100 according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these A preferred embodiment of the present invention will be described in detail according to the order shown below:

[1] Configuration of the display apparatus according to an embodiment of the present invention

[2] Operations of the display apparatus according to an embodiment of the present invention

[3] Summary

[1] Configuration of the Display Apparatus According to an Embodiment of the Present Invention First, the configuration of the display apparatus according to an embodiment of the present invention will be described. FIG. 1 is an explanatory view illustrating the configuration of the display apparatus 100 according to an embodiment of the present invention. The configuration of the display apparatus 100 according to an embodiment of the present invention will be described below using FIG. 1.

As shown in FIG. 1, the display apparatus 100 according to an embodiment of the present invention includes a digital tuner 101, a descramble unit 102, a demultiplexer 103, a decoding unit 104, an OSD (On Screen Display) processing unit 105, a video signal processing circuit 106, a sound signal processing circuit 107, the display unit 108, a sound output unit 109, the control unit 110, a ROM 111, a RAM 112, an EEPROM 113, a clock circuit 114, an HDD interface 115, an HDD 116, a key interface 117, a key input unit 118, a remote controller interface 119, a remote controller signal receiving unit 120, a network interface 121, and an external interface 122.

The digital tuner 101 is used to demodulate broadcast waves received by an antenna 12. The antenna 12 may be, in addition to an antenna capable of receiving analog broadcasting, a UHF (Ultra High Frequency) antenna capable of receiving terrestrial digital broadcasting or a parabolic antenna capable of receiving BS (Broadcasting Satellite) digital broadcasting or CS (Communications Satellite) digital broadcasting. In demodulation by the digital tuner 101, a broadcast signal to be demodulated is tuned in from received broadcast waves based on a tuning control signal from the control unit 110. The broadcast signal demodulated by the digital tuner 101 is supplied to the descramble unit 102.

The descramble unit 102 is used, if encryption processing (scramble processing) has been performed on the broadcast signal demodulated by the digital tuner 101, to perform processing to descramble encryption (descramble processing) based on a decryption signal from the control unit 110. The broadcast signal on which descramble processing is performed by the descramble unit 102 is supplied to the demultiplexer 103.

The demultiplexer 103 is used to demultiplex the broadcast signal supplied from the descramble unit 102 into a video signal and a sound signal. The demultiplexer 103 also extracts data to generate an electronic program guide (hereinafter, referred to as "electronic program guide information") from the broadcast signal supplied from the descramble unit 102. The video signal and sound signal demultiplexed by the demultiplexer 103 are supplied to the decoding unit 104. The electronic program guide information extracted by the demultiplexer 103 is supplied to the control unit 110, where an electronic program guide is generated. The configuration of the control unit 110 will be described in detail later.

The video signal and sound signal demultiplexed by the demultiplexer 103 and output are, for example, data coded by a predetermined coding method such as MPEG (Moving Picture Experts Group).

The decoding unit 104 is used to decode a video signal and a sound signal demultiplexed by the demultiplexer 103 based on the predetermined coding method and output the decoded signals. Though not shown in FIG. 1, the decoding unit 104 includes a video signal decoding unit to decode the video signal and a sound signal decoding unit to decode the sound signal. The video signal decoded by the decoding unit 104 is supplied to the video signal processing circuit 106 via the OSD processing unit 105 and the sound signal is supplied to the sound signal processing circuit 107.

The OSD processing unit 105 is used to perform video signal processing to display an electronic program guide and information about programs and also schedule information acquired from a personal computer 14 or a schedule delivery server 15 in the display unit 108 in accordance with data supplied from the control unit 110. The OSD processing unit 105 performs video signal processing in such a way that the above information is superimposed on a video signal decoded by the decoding unit 104 or video signal processing in such a way that the above information is displayed instead of a video signal and supplies a signal on which the above processing is performed to the video signal processing circuit 106.

The video signal processing circuit 106 is used to perform signal processing on a video signal supplied from the OSD processing unit 105 to display the video signal as video in the display unit 108. On the other hand, the sound signal processing circuit 107 is used to perform signal processing (for example, amplification processing or the like) on a sound signal supplied from the decoding unit 104 to output sound from the sound output unit 109.

The display unit 108 is used to display video based on the video signal on which signal processing is performed by the video signal processing circuit 106. The display unit 108 may be, for example, a liquid crystal display, organic EL display, plasma display, or CRT display. The sound output unit 109 is used to output sound based on the sound signal on which signal processing is performed by the sound signal processing circuit 107. The number of speakers constituting the sound output unit 109 may be one or two or more.

The control unit 110 is used to control each component of the display apparatus 100. Though not shown, the control unit 110 includes a CPU (Central Processing Unit) The control unit 110 and each component of the display apparatus 100 are mutually connected by an internal bus 123. Controls such as ON/OFF of power of the display apparatus 100, an increase/decrease of the volume, and tuning of channels are exercised according to instructions from the user. The control unit 110 also generates information in such a way that the information is made to be displayed in the same screen by matching the time axis based on electronic program guide information demultiplexed by the demultiplexer 103 or schedule information supplied from the network interface 121.

The ROM 111 is used to store, among programs and operation parameters used by the control unit 110 for numeric calculation, information processing or device control, data that does not basically change and is fixed. The RAM 112 is used to store, among programs and operation parameters used by the control unit 110 for numeric calculation, information processing or device control, data that basically changes during various kinds of processing appropriately.

The EEPROM 113 is a rewritable memory that stores parameters and the like set by the user of the display apparatus 100 and a nonvolatile memory that is made not to lose information after the display apparatus 100 is turned off. For example, information about the IP address of the personal computer 14 may be stored in the EEPROM 113 in order to acquire personal schedule information from the personal computer 14 or information about the URI (Uniform Resource Identifier) of the schedule delivery server 15 may be stored in order to acquire event information from the schedule delivery server 15. Information about the IP address of the personal computer 14 or that about the URI of the schedule delivery server 15 may be set, for example, after the display unit 108 being caused to display a setting screen by operating the display apparatus 100, through an operation of the key input unit 118 by the user via the setting screen.

The clock circuit 114 provides the current time and, when information about the current time is displayed in the display unit 108, the control unit 110 acquires information about the current time from the clock circuit 114 and supplies the information to the OSD processing unit 105. Information about the current time may also be made to be displayed in an electronic program guide generated by the control unit 110.

The HDD 116 is used to record/reproduce programs read and executed by the control unit 110 and information (for example, sound files or video files) by internally providing a hard disk and driving the provided hard disk. Data is written and read between the HDD 116 and the control unit 110 via the HDD interface 115.

The key input unit 118 has keys to turn on/off the main power supply of the display apparatus 100, increase/decrease the volume, select broadcasting or the channel and the like arranged therein. When the user operates the key input unit 118, content thereof is sent to the control unit 110 via the key interface 117 and processing according to the operation content is performed by the control unit 110.

The remote controller signal receiving unit 120 is used to receive a signal transmitted from a remote controller 130. When the user operates the remote controller 130 to turn on/off the power, increase/decrease the volume, or select broadcasting or the channel, a signal in accordance with content thereof is sent out from the remote controller 130. After a signal from the remote controller 130 being received by the remote controller signal receiving unit 120, the received signal is sent via the remote controller interface 119 to the control unit 110, where processing in accordance with the operation content is performed.

Though not shown, the remote controller 130 has a power button to turn on/off the display apparatus 100, numeric buttons to select the channel, a button to switch broadcasting to be displayed in the display unit 108, a "program guide" button to display a program guide in the display unit 108, "tools" buttons to execute various functions mounted in the display apparatus 100, a "menu" button to display the setting screen to make various settings for the display apparatus 100 in the display unit 108 and the like arranged thereon.

The remote controller 130 also has a function capable of operating a cursor displayed in the display unit 108 by the remote controller 130 being held in a hand of the user and the remote controller 130 held in the hand being moved for an operation on a program guide displayed in the display unit 108. Hereinafter, such a function will be called a "free cursor mode". To realize the free cursor, the remote controller 130 may be provided with, for example, a gyro-sensor or acceleration sensor and the remote controller signal receiving unit 120 may be capable of receiving information from the gyro-sensor or acceleration sensor reacting to an operation of the remote controller 130. Needless to say, if the cursor displayed in the display unit 108 can be operated by moving the remote controller 130 held in a hand, the present invention is not limited to such an example.

The free cursor mode may be enabled when the user performs a predetermined operation or may typically be effective. An example of the predetermined operation may be, for example, when an electronic program guide is displayed in the display unit 108, to press a predetermined button arranged on the remote controller 130.

The network interface 121 is used to exchange information between the display apparatus 100 and another device connected by a network, for example, the personal computer 14 or the schedule delivery server 15 by radio or wire. In the present embodiment, personal schedule information is received from the personal computer 14 and event information is received from the schedule delivery server 15 and the received information is supplied to the control unit 110. Moreover, information generated by the control unit 110 may be transmitted to the personal computer 14 via the network interface 121.

The external interface 122 is used to exchange information between the display apparatus 100 and another device (for example, a hard disk recorder or an optical disk recorder). For example, the external interface 122 is an interface to exchange information with an optical disk recorder connected to the display apparatus 100 by HDMI (High-Definition Multimedia Interface).

In the foregoing, the hardware configuration of the display apparatus 100 according to an embodiment of the present invention has been described using FIG. 1. In the display apparatus 100 described above, electronic program guide information is extracted from broadcast waves received by the antenna 12 or a parabolic antenna 13, but the present invention is not limited to such an example. For example, when broadcast waves are received via a network, an electronic program guide may be extracted from broadcast waves received by the network interface 121. While broadcast waves are received by the antenna 12 or the parabolic antenna 13, an electronic program guide may separately be received via the network interface 121.

Figure 2:
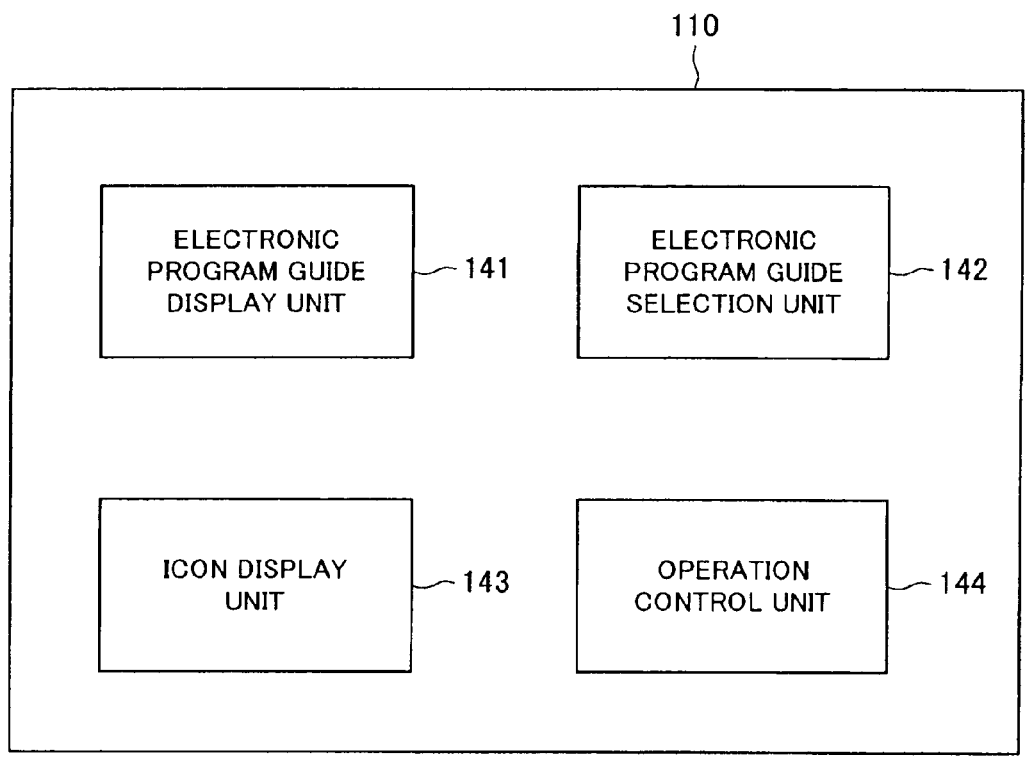
FIG. 2 is an explanatory view illustrating the configuration of a control unit 110 according to an embodiment of the present invention.

Next, the configuration of the control unit 110 in the display apparatus 100 according to an embodiment of the present invention will be described. FIG. 2 is an explanatory view illustrating the configuration of the control unit 110 according to an embodiment of the present invention. The configuration of the control unit 110 according to an embodiment of the present invention will be described using FIG. 2.

As shown in FIG. 2, the control unit 110 according to an embodiment of the present invention includes an electronic program guide display unit 141, an electronic program guide selection unit 142, an icon display unit 143, and an operation control unit 144.

The electronic program guide display unit 141 is used to generate an electronic program guide to be displayed in the display unit 108 based on electronic program guide information demultiplexed by the demultiplexer 103 and causes the display unit 108 to display the electronic program guide. When the display unit 108 being caused to display the electronic program guide, the electronic program guide display unit 141 causes the display unit 108 to display the electronic program guide as a combination of a plurality of parts. An example of the electronic program guide displayed in the display unit 108 by the electronic program guide display unit 141 will be described in detail later.

The electronic program guide selection unit 142 is used to put each part in an electronic program guide displayed in the display unit 108 by the electronic program guide display unit 141 into a selected state when the electronic program guide is operated in free cursor mode. Each part in an electronic program guide may be, for example, a frame of each program displayed in the electronic program guide as a unit or that in which the date or time is displayed. When an electronic program guide is operated in free cursor mode, a part can be put into a selected state by placing the cursor on the part to be operated by operating the cursor displayed in the display unit 108 through an operation of the remote controller 130 and pressing a predetermined button of the remote controller 130. If the remote controller 130 is operated while the selected state is maintained, the part put into the selected state is in a so-called drag state so that the part can freely be moved on the electronic program guide by an operation of the remote controller 130.

If, in the display apparatus 100 according to the present embodiment, an electronic program guide is attempted to be operated in free cursor mode, for example, a predetermined option screen to allow the user to decide whether to change to the free cursor mode may be displayed in the display unit 108 before changing to the free cursor mode by an operation of the remote controller 130 by the user or the like.

The icon display unit 143 is used to cause the display unit 108 to display an icon corresponding to a part in an electronic program guide selected by the electronic program guide selection unit 142 by superimposing the icon on the electronic program guide displayed in the display unit 108. In timing when a drag operation is performed by an operation of the remote controller 130 on a part put into a selected state by the electronic program guide selection unit 142, an icon corresponding to the part is displayed by the icon display unit 143 by superimposing the icon on the electronic program guide.

If, for example, a part selected by the electronic program guide selection unit 142 is a program, icons for causing functions such as tuning of the program, viewing setting, recording setting, and program explanations to be executed are displayed by the icon display unit 143. An example of icons displayed by superimposing on an electronic program guide will be described in detail later.

The operation control unit 144 is an example of execution means of the present invention and is used to control an operation corresponding to an icon when a so-called drop operation by a part in an electronic program guide selected by the electronic program guide selection unit 142 is performed on the icon displayed by the icon display unit 143. While a concrete operation will be described later, if, for example, when a part selected by the electronic program guide selection unit 142 is a program, a recording setting icon is displayed by the icon display unit 143 and the program is dropped onto the recording setting icon, a recording setting operation of the program is performed by the operation control unit 144.

In the foregoing, the configuration of the control unit 110 in the display apparatus 100 according to an embodiment of the present invention has been described. Next, operations of the display apparatus 100 according to an embodiment of the present invention will be described.

Figure 3:
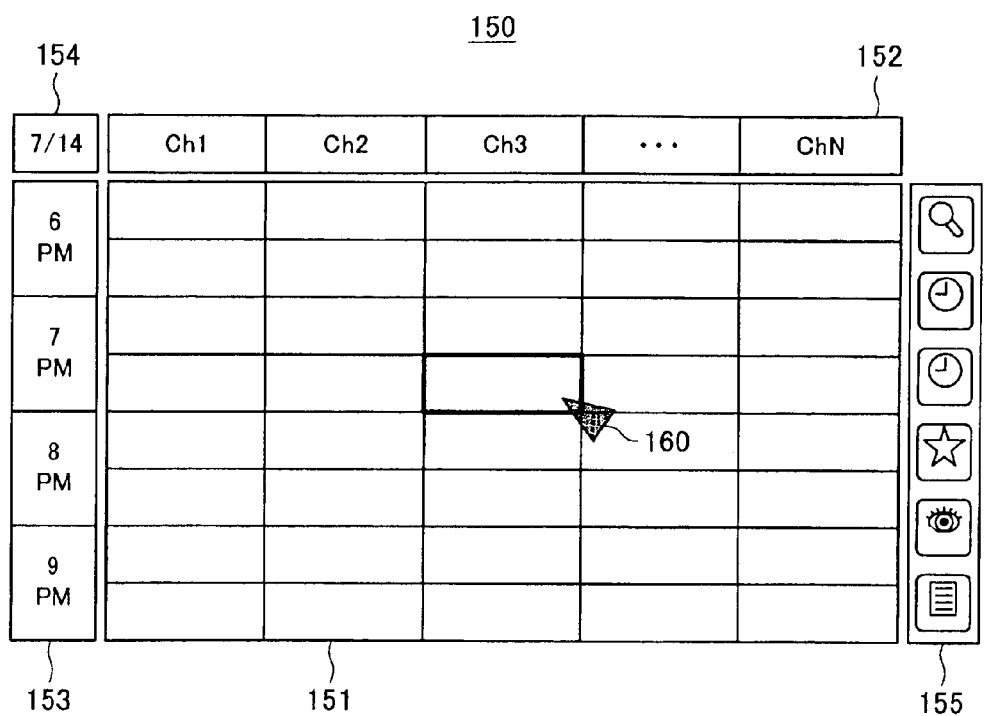
FIG. 3 is an explanatory view exemplifying an electronic program guide 150.

[2] Operations of the Display Apparatus According to an Embodiment of the Present Invention FIG. 3 is an explanatory view exemplifying the electronic program guide 150 displayed in the display unit 108 by the electronic program guide display unit 141 according to an embodiment of the present invention. FIG. 3 also shows a cursor 160 to operate an electronic program guide in free cursor mode.

As shown in FIG. 3, the electronic program guide 150 is displayed in the display unit 108 by the electronic program guide display unit 141 according to an embodiment of the present invention. The electronic program guide 150 shown in FIG. 3 has a program display unit 151, a channel display unit 152, a time zone display unit 153, a date display unit 154, and an icon display unit 155 displayed therein. Information about one or a plurality of programs is displayed in the program display unit 151 and each program can be selected as a part by the cursor 160. In addition to programs, each channel displayed in the channel display unit 152 or each time zone displayed in the time zone display unit 153 can also be selected as a part by the cursor 160. An operation when these parts are selected by the cursor 160 will be described in detail later.

In FIG. 3, the frame of the program pointed to by the cursor 160 is displayed with a thick line so that the program currently pointed to is displayed to be easily understandable. Thus, a part of the electronic program guide 150 pointed to by the cursor 160 may be displayed to be easily understandable by an operation of the remote controller 130.

Figure 4:
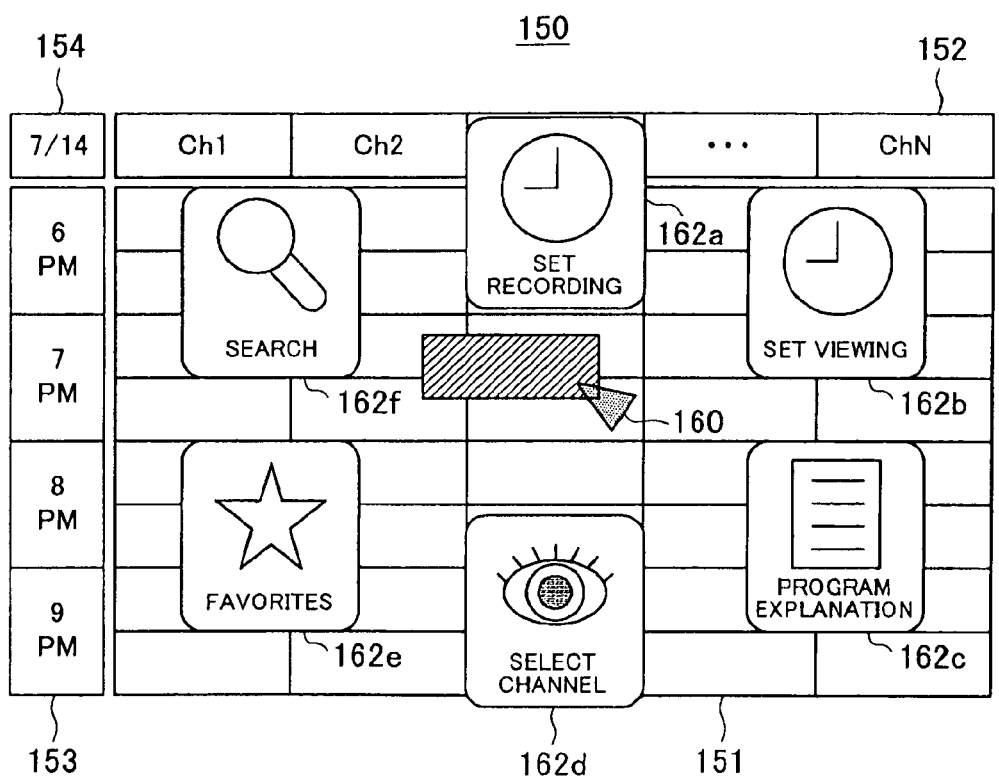
FIG. 4 is an explanatory view exemplifying a screen displayed in a display unit 108 according to an embodiment of the present invention.

FIG. 4 is an explanatory view exemplifying the screen displayed in the display unit 108 when a program displayed in the electronic program guide 150 shown in FIG. 3 is selected by an operation of the remote controller 130 and further a drag operation of the program is performed by an operation of the remote controller 130.

In the display apparatus 100 according to the present embodiment, as shown in FIG. 4, the cursor 160 can be fitted to a part of a program for which control is desired such as recording setting and viewing setting from among programs displayed in the electronic program guide 150 by an operation of the remote controller 130. Further, if the part of the program to which the cursor 160 is fitted is selected by a predetermined operation of the remote controller 130 and while the selected state of the part of the program is maintained, a drag operation is further performed by moving the remote controller 130, operation icons 162a to 162f related to the selected program can be made to be displayed by the icon display unit 143 near the cursor 160 by being superimposed on the electronic program guide 150.

Figure 5:
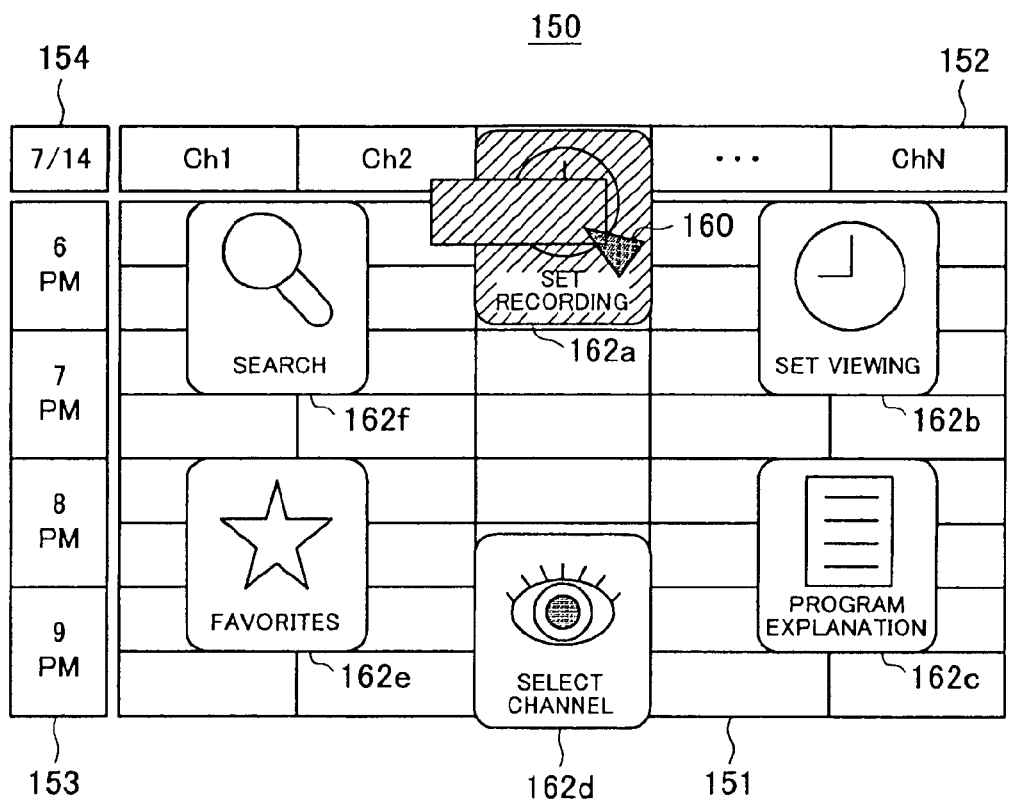
FIG. 5 is an explanatory view exemplifying the screen displayed in the display unit 108 according to the embodiment.

The operation icons 162a to 162f may be made to be displayed larger so that the part of the selected program can be dropped more easily. Here, a program is dragged as a part and thus, operations icons (In FIG. 4, Set recording, Set viewing, Program explanation, Select channel, Favorites, and Search) for operations on the program are displayed. If the part of the program in the selected state is dropped onto the operation icon 162a for recording setting, recording of the program can be set. The program set for recording will be recorded, for example, in the HDD 116 when the broadcast start time of the program comes. In the present invention, if a hard disk recorder, DVD recorder or any other recording/reproducing apparatus is connected to the display apparatus 100, information about recording setting of the program may naturally be transmitted to such a device to cause the device to record the program. A recording setting operation of a program may be performed by the operation control unit 144. FIG. 5 is an explanatory view exemplifying the screen displayed in the display unit 108 when a part of a program in the selected state is dropped onto the operation icon 162a for recording setting.

In addition, if a part of a program in the selected state is dropped onto the operation icon 162b for viewing setting, viewing of the program can be set and, if a part of a program in the selected state is dropped onto the operation icon 162c for program explanation, a screen of the program explanation of the program is displayed (Because content of the screen of the program explanation is not directly related to the present embodiment, a detailed description thereof is omitted). Further, if a part of a program in the selected state is dropped onto the operation icon 162d for channel selection, the channel that broadcasts the program can be selected and, if a part of a program in the selected state is dropped onto the operation icon 162e for registration of favorites, the program can be registered as a favorite program. If a program is registered as a favorite program, for example, programs related to the program can be recommended to users of the display apparatus 100. Further, if a part of a program in the selected state is dropped onto the operation icon 162f for search, programs having the same program name as the program can be retrieved. Incidentally, the operations described above may be performed by the operation control unit 144.

Needless to say, in the present invention, content, the number, positions and the like of operation icons displayed by being superimposed on an electronic program guide when a part of a program is dragged are not limited to the above examples. Operation icons caused to be displayed by being superimposed on an electronic program guide may be caused to be displayed from the upper left corner of the screen in descending order of frequency of execution.

Figure 6:
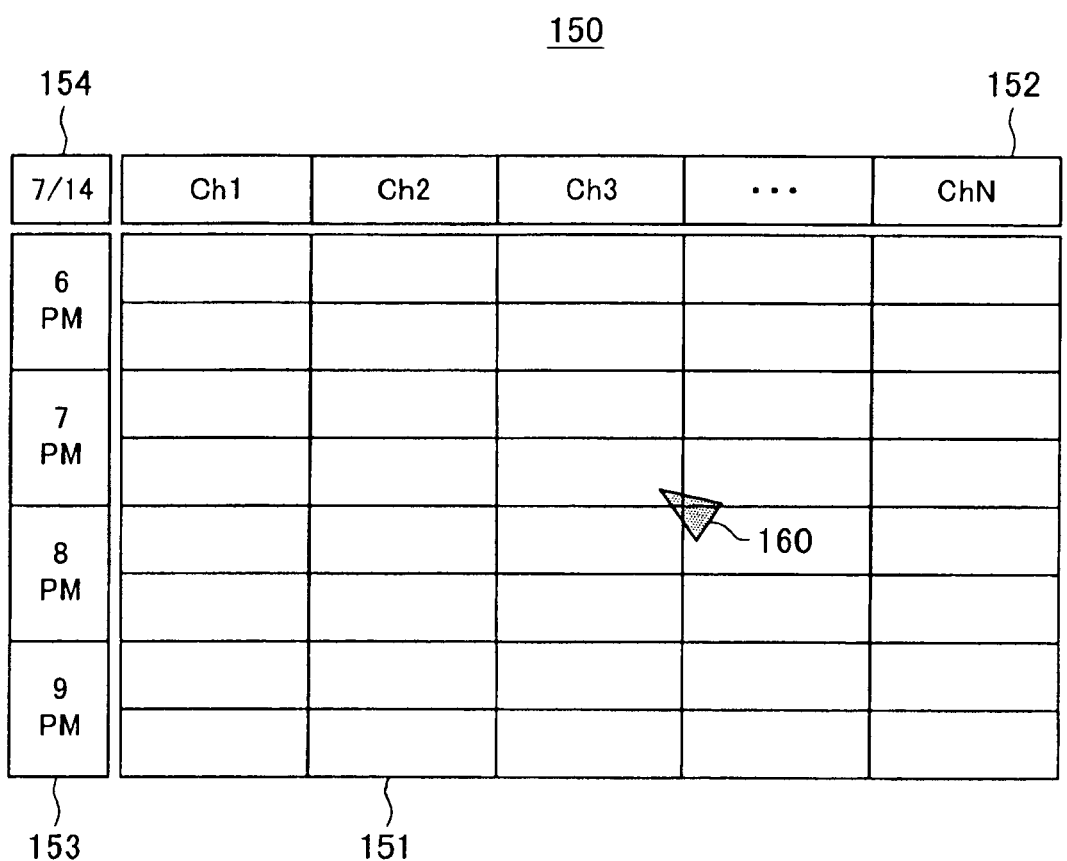
FIG. 6 is an explanatory view exemplifying the screen displayed in the display unit 108 according to the embodiment.

If each part displayed in the electronic program guide 150 is selected and dragged by the remote controller 130, as shown in FIG. 4, operation icons can be caused to be displayed by being superimposed on an electronic program guide 150. Here, if the selected state of a part is deselected without the part being dropped onto an operation icon, the icon display unit 143 may clear the display of operation icons. FIG. 6 is an explanatory view exemplifying the screen displayed in the display unit 108 when operation icons are removed from the electronic program guide 150 by the selected state of a part being deselected. If, for example, the selected state of a part is maintained by holding a predetermined button (for example, the "decision button") of the remote controller 130 down, an example of the method of deselecting the selected state of a part may be to release the button to deselect the selected state of the part.

Figure 7:
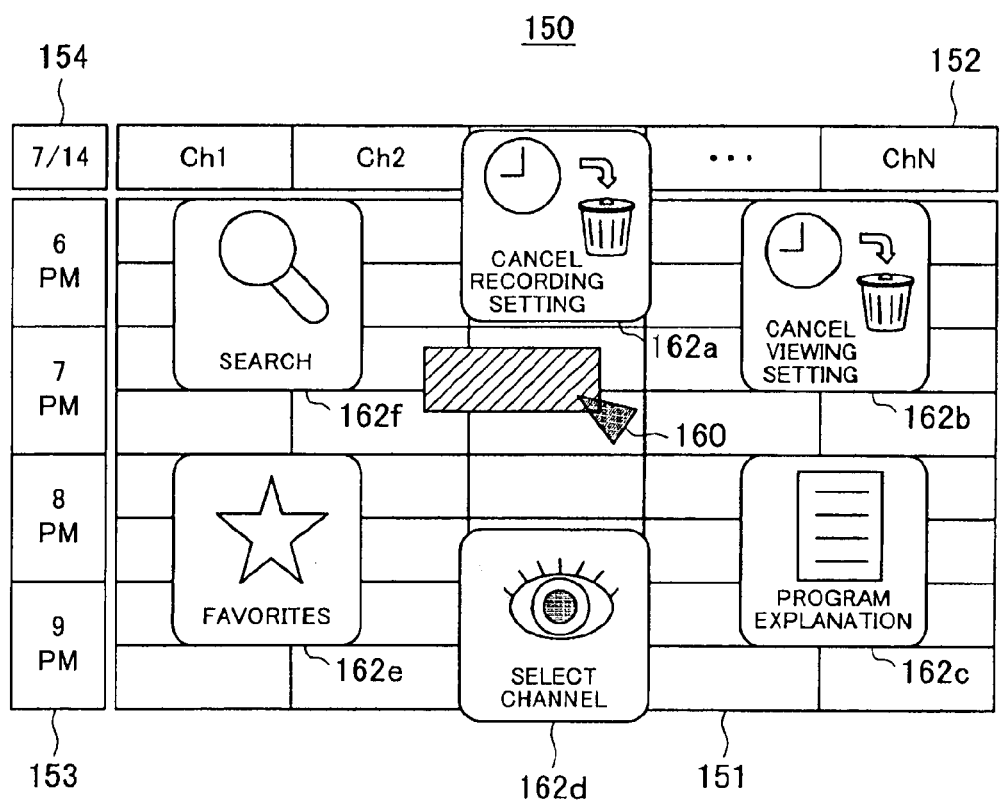
FIG. 7 is an explanatory view exemplifying the screen displayed in the display unit 108 according to the embodiment.

The operation icon displayed by the icon display unit 143 while a part of an electronic program guide being dragged may be changed depending on the type of the part being dragged or conditions of the part while being dragged. If, for example, the selected part is a program for which recording or viewing is already set, the icon display unit 143 may cause an operation icon to cancel the recording setting or viewing setting to be displayed instead of an operation icon for recording setting or viewing setting shown in FIG. 4. FIG. 7 is an explanatory view exemplifying the screen displayed in the display unit 108 when a part of a program for which recording or viewing is already set is dragged. If a part of a program for which recording or viewing is already set is dragged, as shown in FIG. 7, the icon display unit 143 may cause an operation icon 162a to cancel the recording setting or an operation icon 162b to cancel the viewing setting to be displayed.

If there are many operations related to a part being dragged and it is difficult to display operation icons corresponding to the part in the screen at a time, the operation icons may be displayed over a plurality of pages. In such a case, the page on which operation icons are displayed may be switched by selecting a switching icon by operating the remote controller 130 to fit the cursor 160 to the switching icon or the display of the operation icon may be changed by making a specific gesture such as rotating or swinging the remote controller 130 by twisting an arm holding the remote controller 130.

Figure 8:
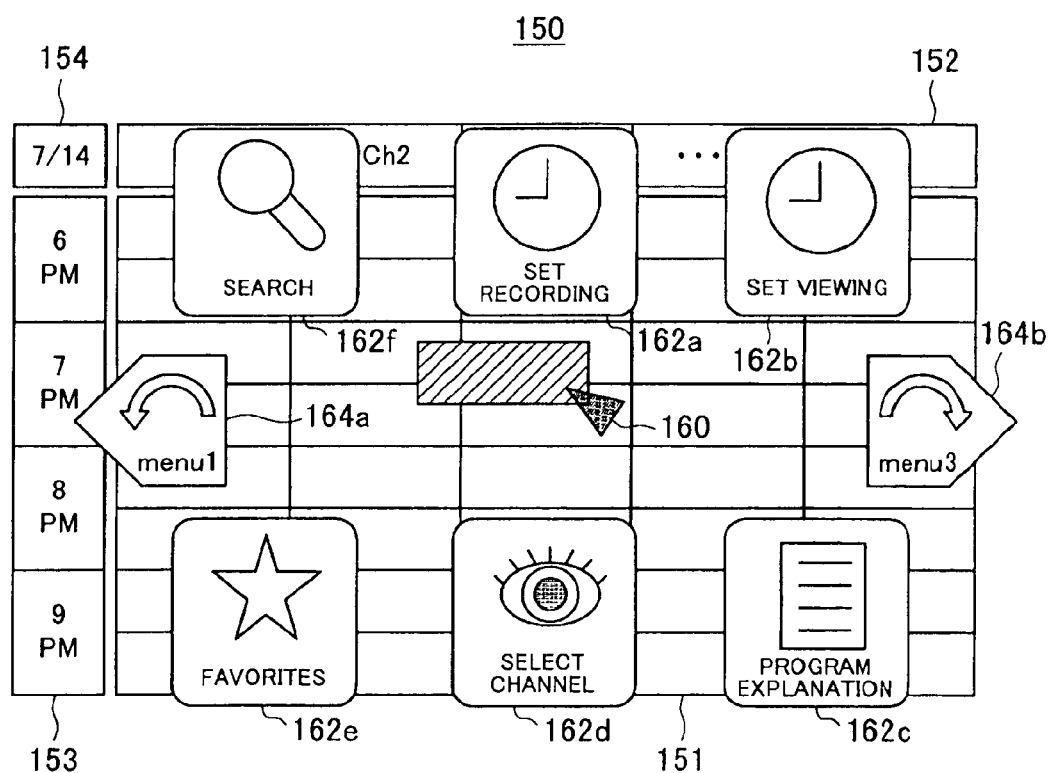
FIG. 8 is an explanatory view exemplifying the screen displayed in the display unit 108 according to the embodiment.

FIG. 8 is an explanatory view exemplifying the screen displayed in the display unit 108 when it is difficult to display operation icons corresponding to a part in the screen at a time and the operation icons are caused to be displayed over a plurality of pages. In the present embodiment, a part being dragged is a program and up to six operation icons for operations related to the program are allowed to be displayed in one screen. If, in such a case, seven or more operation icons should be displayed, as shown in FIG. 8, a page backward icon 164a and a page forward icon 164b may be caused to be displayed.

A specific operation (gesture) of the remote controller 130 is allocated to each of the page backward icon 164a and the page forward icon 164b shown in FIG. 8. For example, an operation (gesture pattern) to rotate the remote controller 130 counterclockwise around an axis in the longitudinal direction is allocated to the page backward icon 164a and an operation to rotate the remote controller 130 clockwise around the axis in the longitudinal direction is allocated to the page forward icon 164b. Therefore, the page of operation icons can be switched forward or backward not only by placing the cursor 160 while dragging a part on the page backward icon 164a or the page forward icon 164b, but also by rotating the remote controller 130 by twisting an arm holding the remote controller 130 while a part being dragged.

Figure 9:
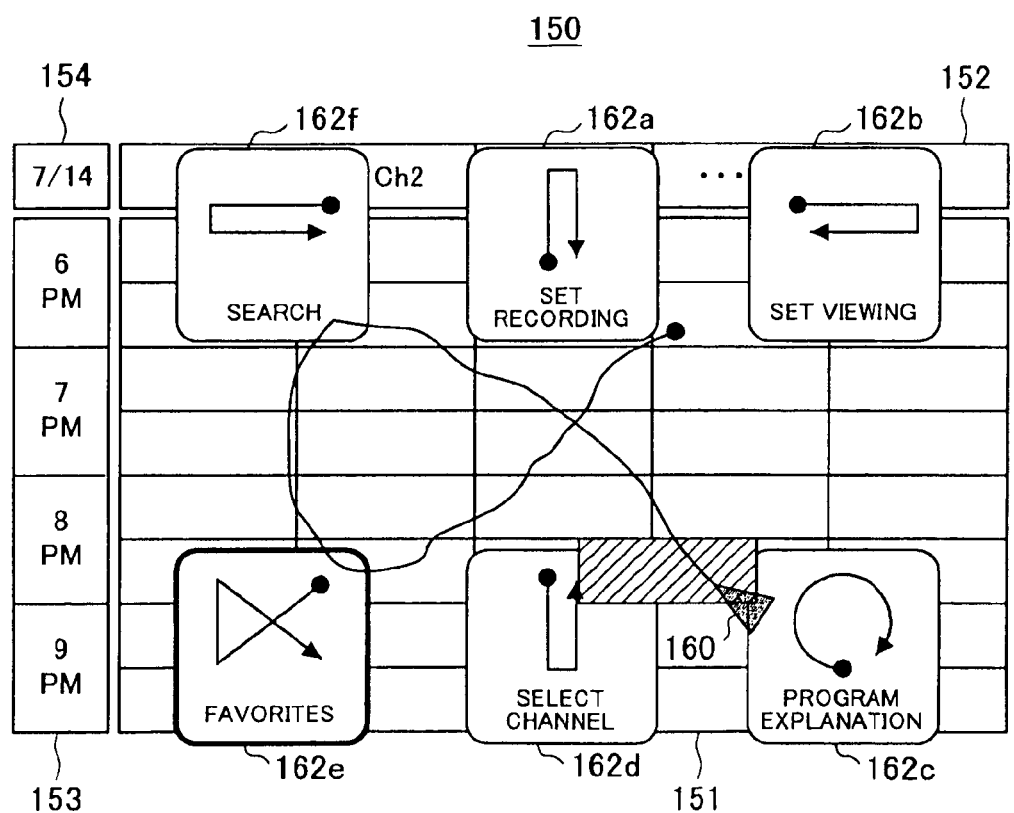
FIG. 9 is an explanatory view exemplifying the screen displayed in the display unit 108 according to the embodiment.

A cursor trajectory (gesture pattern) while being dragged may be allocated to an operation icon displayed by each part in the electronic program guide 150 being dragged. FIG. 9 is an explanatory view exemplifying the screen displayed in the display unit 108 when a cursor trajectory is allocated to each operation icon. An icon trajectory is schematically drawn for each of the operation icons 162a to 162f shown in FIG. 9 and if the cursor 160 dragging a part is moved by the remote controller 130 as drawn in the operation icons 162a to 162f, the operation control unit 144 detects an operation of the cursor 160 so that an operation corresponding to the trajectory will be performed. FIG. 9 shows a case in which the cursor 160 dragging a part is moved by the remote controller 130 like a trajectory drawn in the operation icon 162e for favorite registration. The trajectory of the cursor 160 shown in FIG. 9 is added for convenience of description and the display unit 108 may not be caused to display the trajectory of the cursor 160.

Drag and drop operations of parts displayed in the electronic program guide 150 may be enabled for other than programs. For example, by dragging and dropping a part in which a date is displayed, a list of reservation settings for the day, a search of programs to be broadcast for the day, the display of recommended programs for the day, or switching of the display position of a program guide may be provided.

Figure 10:
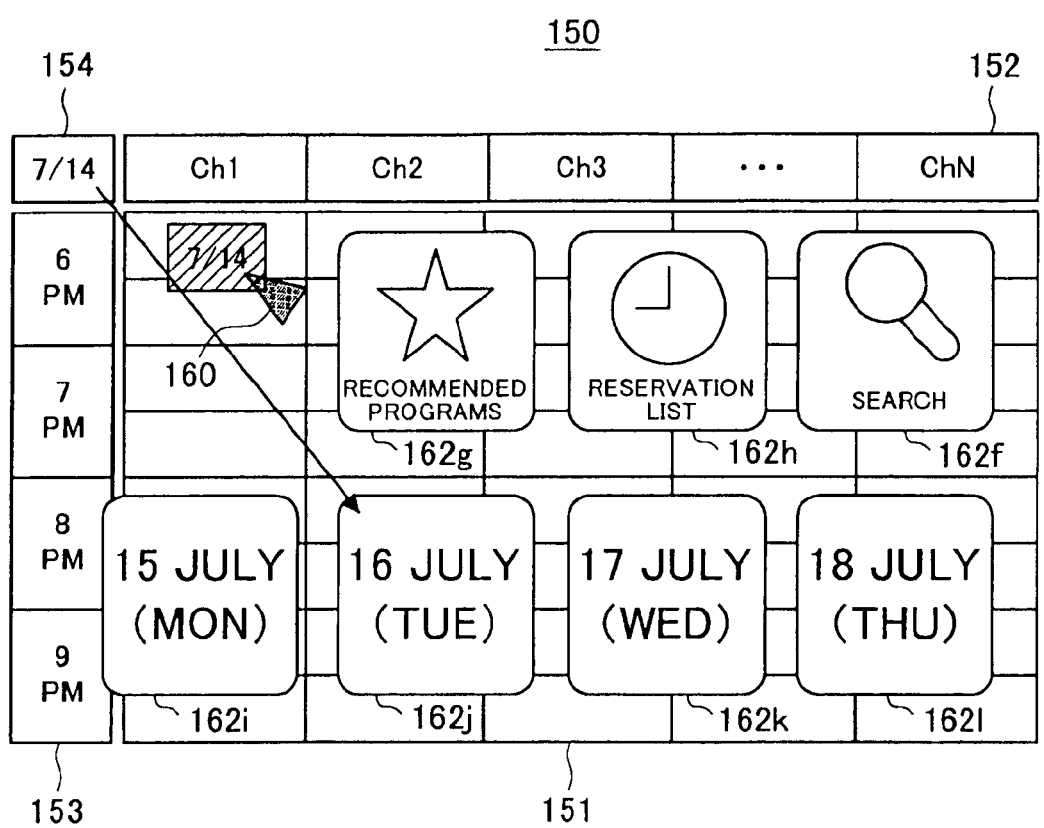
FIG. 10 is an explanatory view exemplifying the screen displayed in the display unit 108 according to the embodiment.

FIG. 10 is an explanatory view exemplifying the screen displayed in the display unit 108 when a part of date is dragged. FIG. 10 shows a case in which operation icons 162f to 162l are displayed by the icon display unit 143 by being superimposed on the electronic program guide 150 after a part of date in which "7/14" is displayed at the upper left corner of the electronic program guide 150 being dragged. If, for example, the part of date is dropped onto the operation icon 162g for displaying recommended programs, recommended programs for the day are listed in the display unit 108. Recommended programs may be extracted by the viewing history, recording history, or favorite registration history of the user being analyzed by operation control unit 144. If the part of date is dropped onto the operation icon 162h for displaying a list of programs set for recording or those set for viewing, a list of programs set for recording for the day or those set for viewing for the day is displayed in the display unit 108. If the part of date is dropped onto the operation icon 162f for a search, a search screen of programs broadcast for the day is displayed in the display unit 108.

If the part of date is dropped onto the operation icons 162i to 162l for switching the date, the electronic program guide 150 is switched for the date that is displayed in the dropped operation icon. If, for example, the part of date is dropped onto the operation icon 162*j* in which "7/16 (Tue)" is displayed, the display of the electronic program guide 150 can be switched from programs broadcast on July 14 to those broadcast on July 16.

Thus, various kinds of operations concerning an electronic program guide can be performed not only on parts of program, but also on parts already displayed in the screen as a starting point so that operations can be performed intuitively without opening an option menu separately or pressing a dedicated button arranged on a remote control.

While FIG. 10 shows a case in which a part of date is dragged and dropped, operations related to a channel such as a channel selection, search, recommended programs broadcast over the applicable channel, and display of a list of reservation settings may be performed by dragging a part in which a channel name is displayed and dropping the part onto an operation icon displayed by being superimposed on an electronic program guide.

Figure 11:
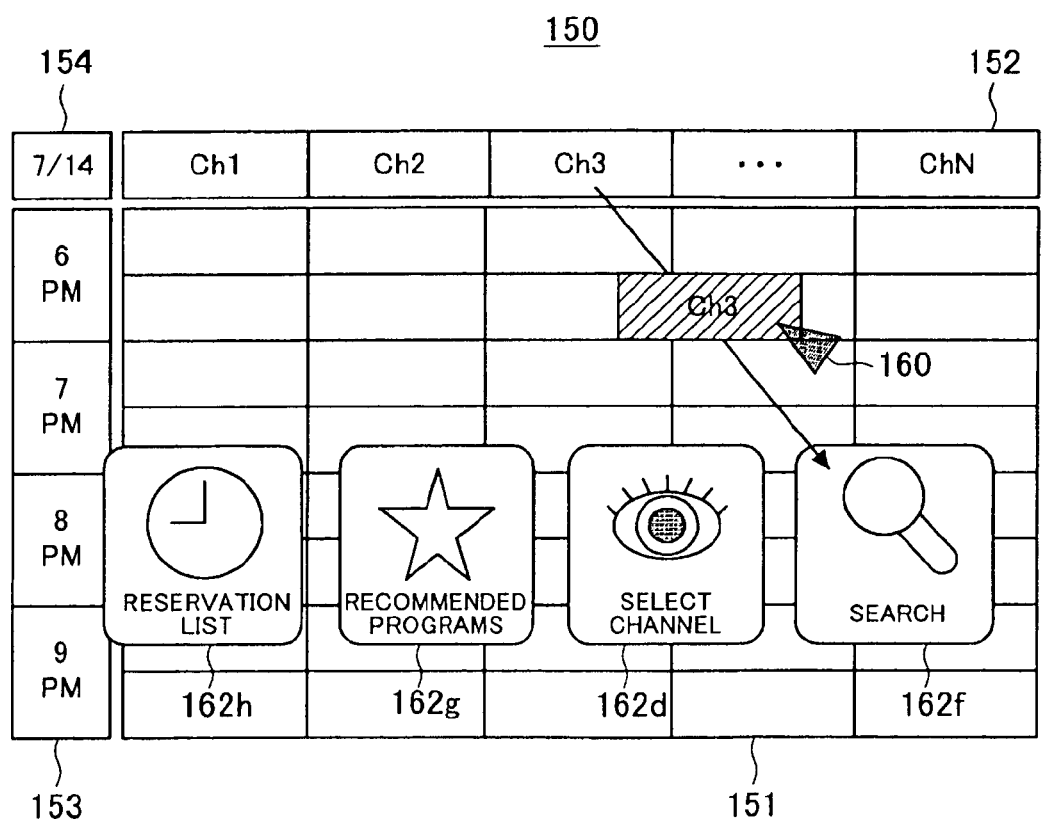
FIG. 11 is an explanatory view exemplifying the screen displayed in the display unit 108 according to the embodiment.
Figure 12:
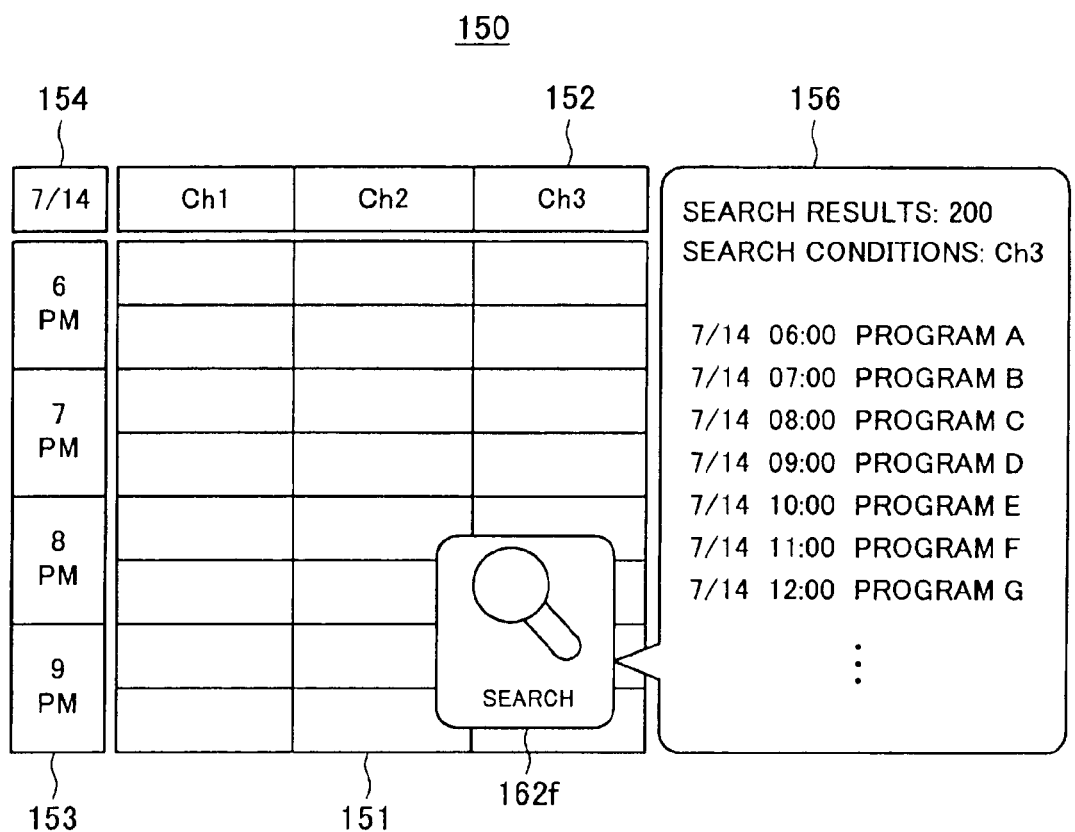
FIG. 12 is an explanatory view exemplifying the screen displayed in the display unit 108 according to the embodiment.

FIG. 11 is an explanatory view exemplifying the screen displayed in the display unit 108 when a part of channel name is dragged. FIG. 11 shows a case in which the operation icons 162*d*, 162*f*, 162*g*, and 162*h* are displayed by the icon display unit 143 by being superimposed on the electronic program guide 150 after a part of channel name being dragged. If, for example, a list of programs broadcast over the channel displayed in the dragged part should be displayed, the operation control unit 144 can cause a search result display unit 156 to display a list of programs by dropping the part onto the operation icon 162*f* for a search. FIG. 12 exemplifies a list of programs displayed in the search result display unit 156 as a search result when a part in which "Ch 3" is displayed is dropped onto the operation icon 162*f*. In the search result display unit 156, as shown in FIG. 12, the number of programs that match search conditions, search conditions, and a list of search results may be displayed.

Figure 13:
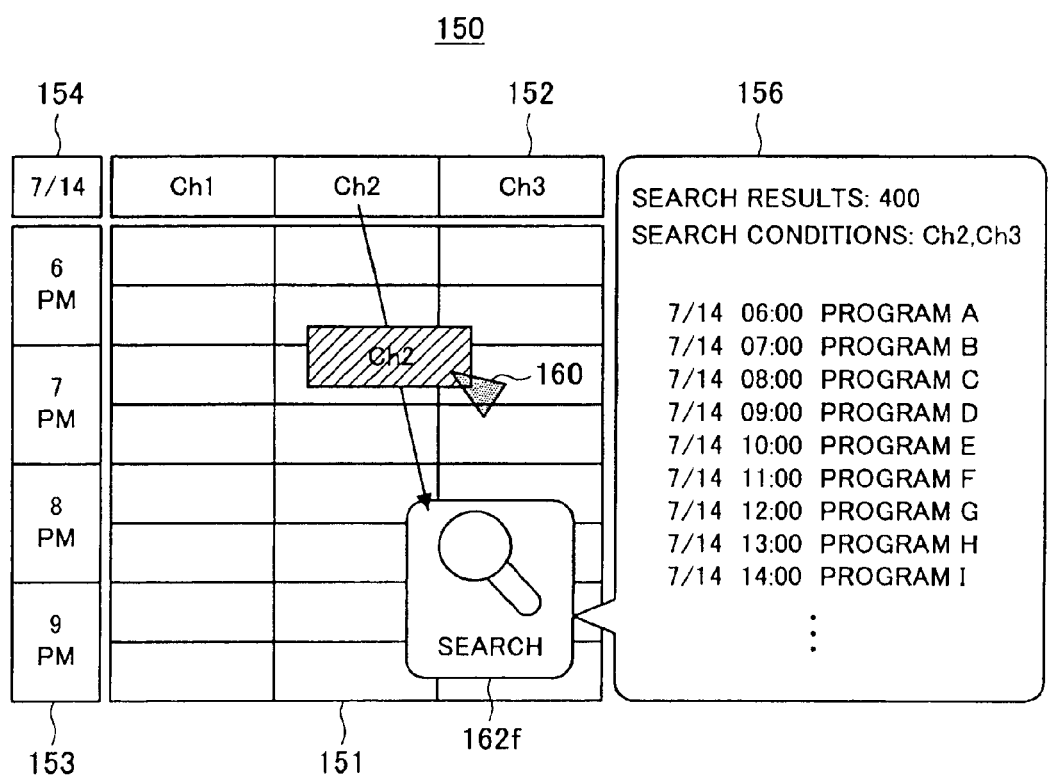
FIG. 13 is an explanatory view exemplifying the screen displayed in the display unit 108 according to the embodiment.

Search conditions may be added by further dragging another part and dropping the dragged part onto the operation icon 162*f* for a search in a state in which search results are displayed. FIG. 13 is an explanatory view illustrating a state after search conditions are added by dragging a part in which another channel is displayed and dropping the part onto the operation icon 162*f* while, as shown in FIG. 12, a list of programs broadcast on "Ch 3" is displayed as a search result. FIG. 13 shows a case in which a part in which "Ch 2" is displayed is dropped onto the operation icon 162*f*. Thus, an operation on a plurality of parts can be performed by dragging and dropping parts of a plurality of channel names onto an operation icon.

Figure 14:
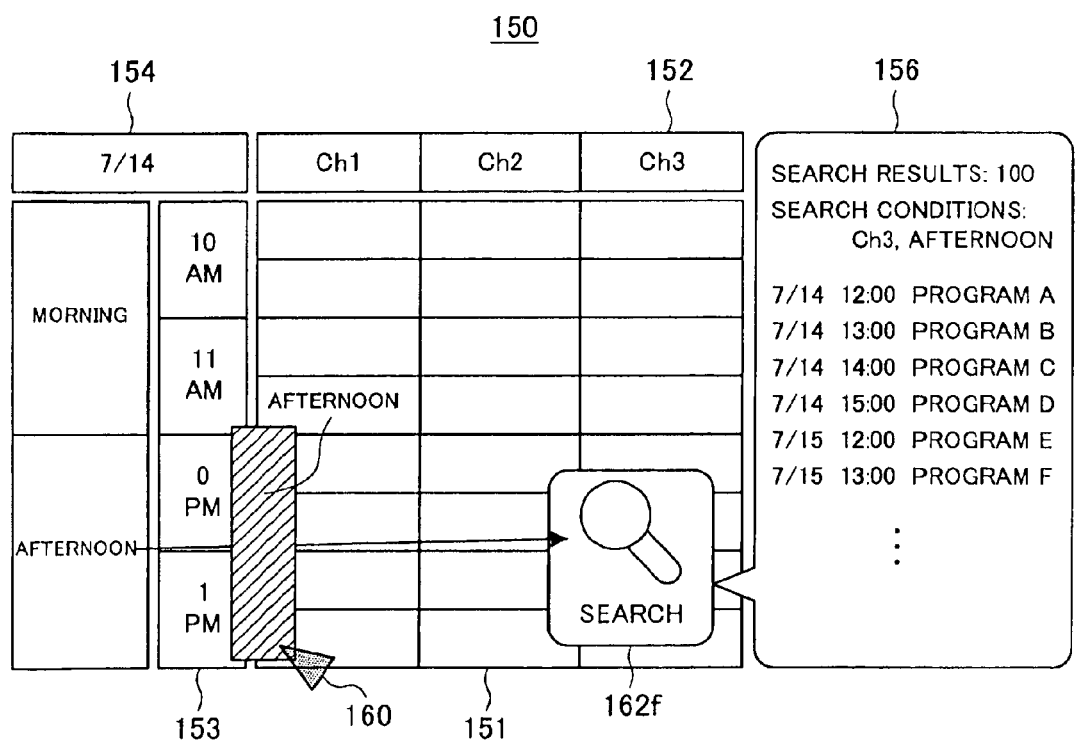
FIG. 14 is an explanatory view exemplifying the screen displayed in the display unit 108 according to the embodiment.

While FIG. 11 shows a case in which a part of channel name is dragged and dropped onto an operation icon displayed by being superimposed on an electronic program guide, a part in which a time zone is displayed may be dragged and dropped onto an operation icon displayed by being superimposed on an electronic program guide to perform operations narrowed down to the time zone displayed in the part. FIG. 14 is an explanatory view illustrating a case in which a part in which the time zone display unit "Afternoon" is displayed is dragged and dropped onto the operation icon 162*f* while, as shown in FIG. 12, a list of programs broadcast on "Ch 3" is displayed as a search result. By dropping a plurality of parts onto the operation icon 162*f* in this manner, a search is performed by the operation control unit 144 under narrowed-down conditions that programs are broadcast on Ch 3 and also broadcast in the time zone of afternoon. Similarly, a part in which a date or time is displayed may be dragged and dropped onto the operation icon 162*f*.

In the present embodiment, the range of search is made broader if parts of the same type (for example, parts related to the channel or those related to the time) are included in search conditions and the range of search is narrowed down if parts of different types (a combination of the channel and time or the like) are included in search conditions. Needless to say, the present invention is not limited to such an example and the range of search may be made broader even if parts of different types are included in search conditions.

Figure 15:
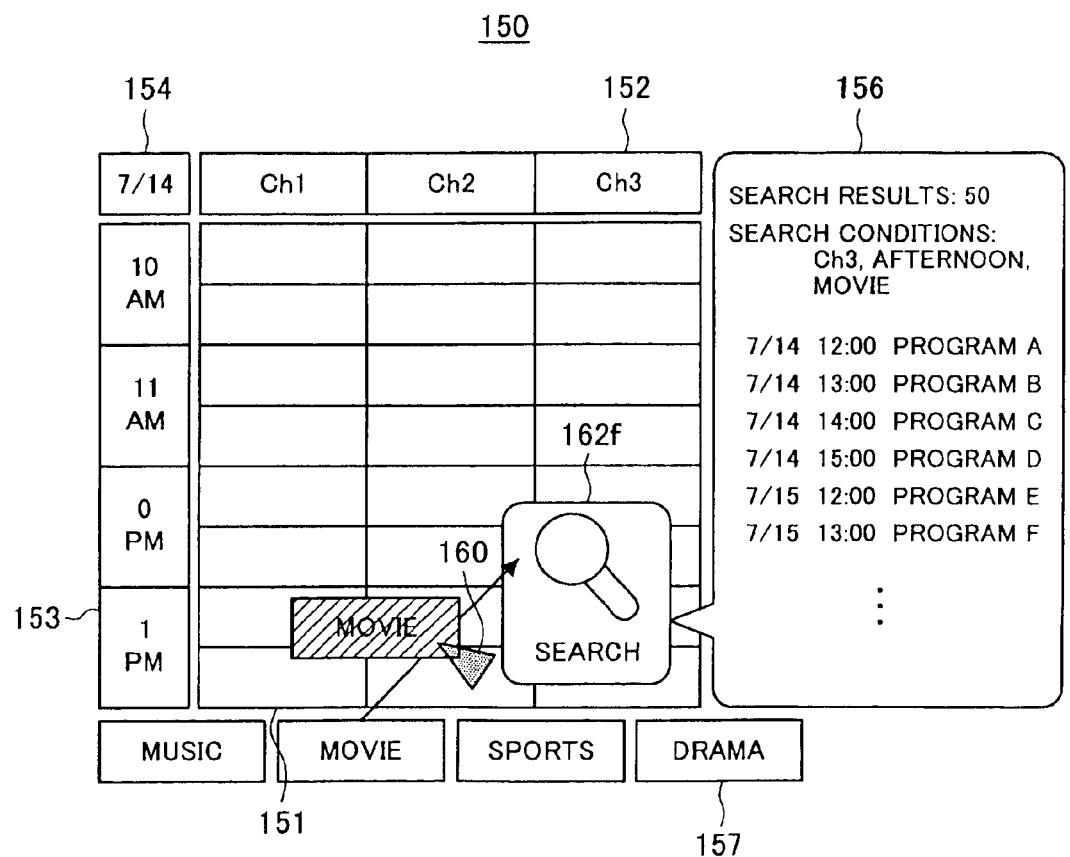
FIG. 15 is an explanatory view exemplifying the screen displayed in the display unit 108 according to the embodiment.

Parts in which the genre of program is displayed may be displayed in the electronic program guide 150 to narrow down the range of search. FIG. 15 is an explanatory view illustrating a case in which a genre display unit 157 in which a genre of a program is displayed in the electronic program guide 150 is displayed. Further, FIG. 15 is an explanatory view illustrating a case in which a part in which "Movie" is displayed is dragged from the genre display unit 157 and dropped onto the operation icon 162*f* while, as shown in FIG. 12, a list of programs broadcast on "Ch 3" is displayed as a search result. By dropping a plurality of parts onto the operation icon 162*f* in this manner, a search is performed by the operation control unit 144 under narrowed-down conditions that programs are broadcast on Ch 3 and also whose genre is the movie.

Figure 16:
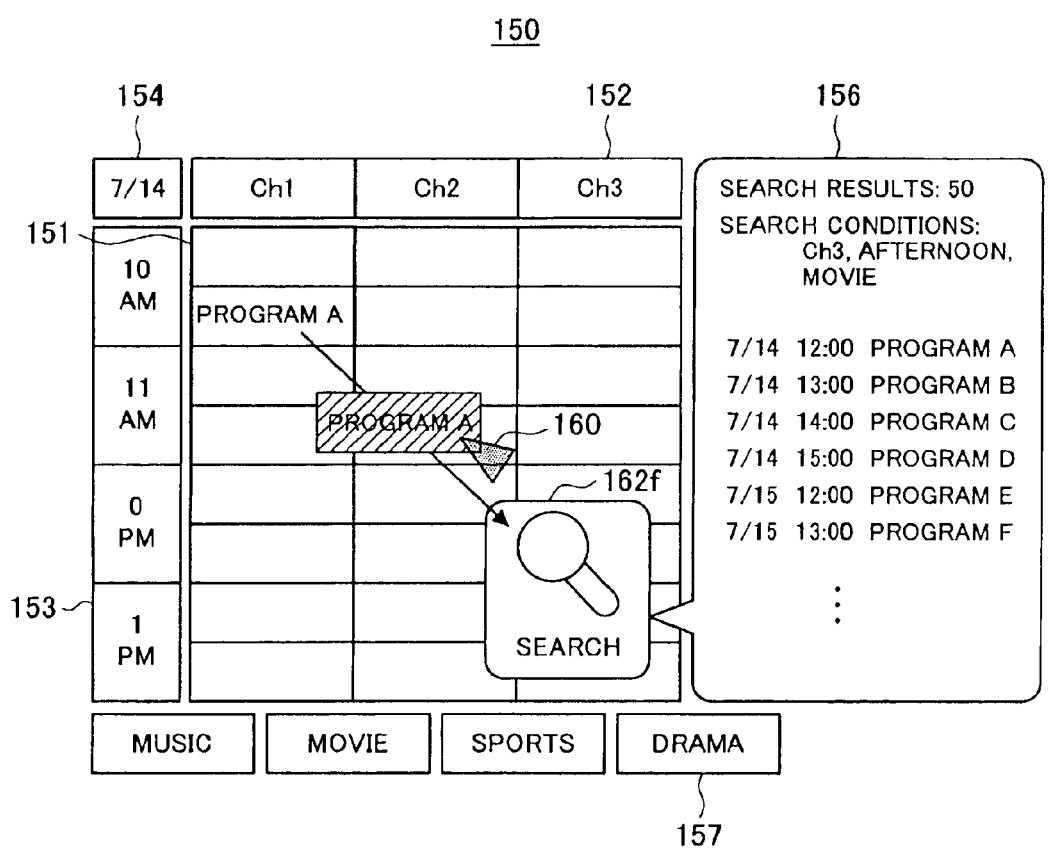
FIG. 16 is an explanatory view exemplifying the screen displayed in the display unit 108 according to the embodiment.

When a search result is displayed in the search result display unit 156, a part corresponding to a program displayed as a search result may be made draggable from the program display unit 151 and droppable onto the operation icon 162*f*. FIG. 16 is an explanatory view illustrating a case in which while, as shown in FIG. 12, a list of programs broadcast on "Ch 3" is displayed as a search result, "program A" contained in the list is dragged from the program display unit 151 and dropped onto the operation icon 162*f*. By dragging a part of program from the program display unit 151 and dropping the part onto an operation icon in this manner, programs may be retrieved using the title of program, keywords contained in detailed program information and the like.

Figure 17:
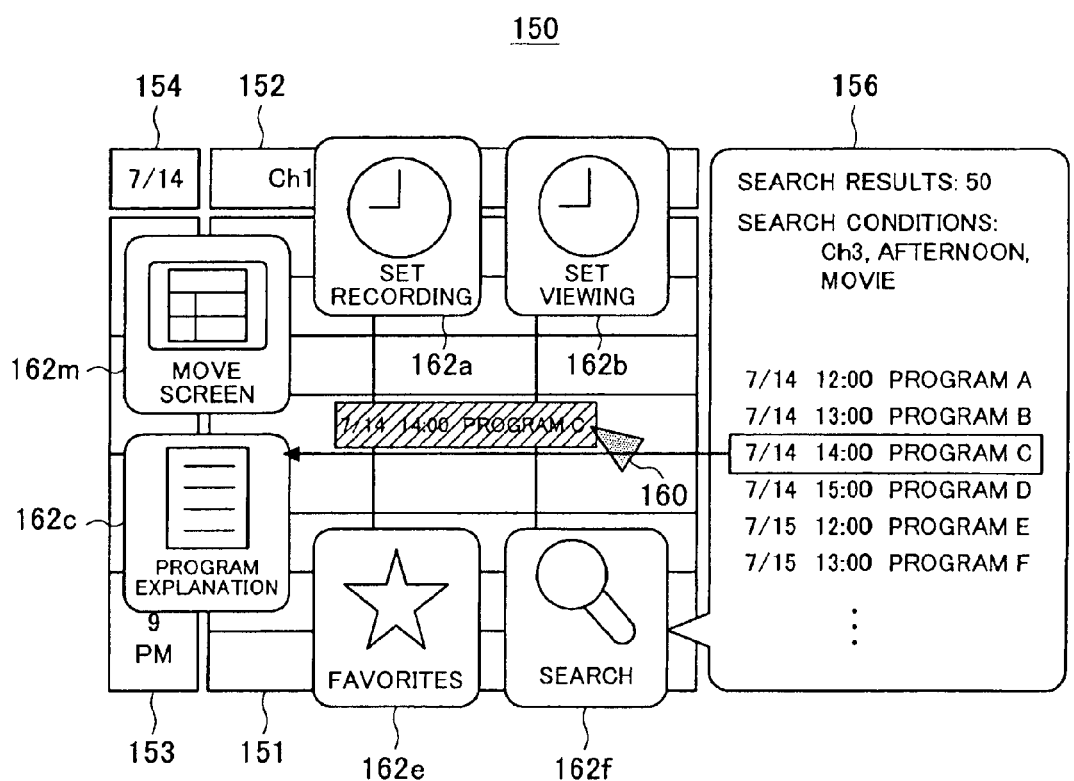
FIG. 17 is an explanatory view exemplifying the screen displayed in the display unit 108 according to the embodiment.

Information (for example, the channel name, program name, and time) displayed in the search result display unit 156 as a search result may also be made draggable & droppable as a part. By making information displayed in the search result display unit 156 also draggable & droppable, various kinds of operations on the information can subsequently be performed. FIG. 17 is an explanatory view illustrating a case in which a program is dragged from a search result displayed in the search result display unit 156 as a part and dropped onto a displayed operation icon. If a part in which "7/14 14:00 Program C" is displayed is selected and dragged from a search result displayed in the search result display unit 156 and, as shown, for example, in FIG. 17, dropped onto the operation icon 162*c* for displaying a program explanation, the explanation of the program is displayed in the display unit 108 by the operation control unit 144. If the part is dragged and dropped onto an operation icon 162*m* for screen movement, the electronic program guide can be caused to be displayed by the operation control unit 144 in such a way that the program displayed in the part is contained in the program display unit 151.

Thus, by providing a consistent operation system of drag & drop operation, a series of operations of search execution, addition of search conditions, and operations on programs detected by the search can intuitively be performed only through repeated drag & drop operations.

Figure 18:
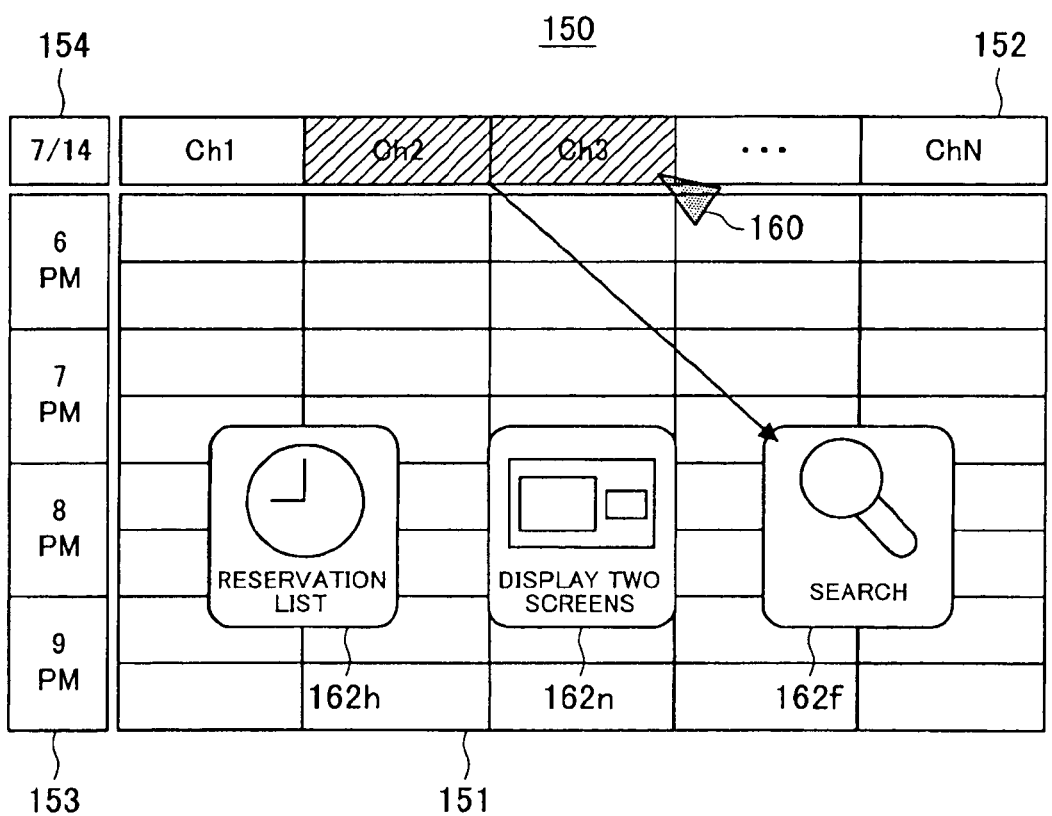
FIG. 18 is an explanatory view exemplifying the screen displayed in the display unit 108 according to the embodiment.

A plurality of parts displayed in the electronic program guide 150 may be made selectable before being dragged by operating the remote controller 130. By making a plurality of parts selectable, the plurality of parts can be dragged and dropped onto an operation icon simultaneously. FIG. 18 is an explanatory view exemplifying the screen displayed in the display unit 108 when a plurality of parts in which a channel name is displayed is selected and dragged. FIG. 18 shows a case in which two parts in which a channel name is displayed ("Ch 2" and "Ch 3") are selected and dragged and in this case, the operation icon 162*h* for displaying a reservation list, an operation icon 162*n* for causing a display of two screens, and the operation icon 162*f* for a program search are displayed by the icon display unit 143 by being superimposed on the electronic program guide 150.

Figure 19:
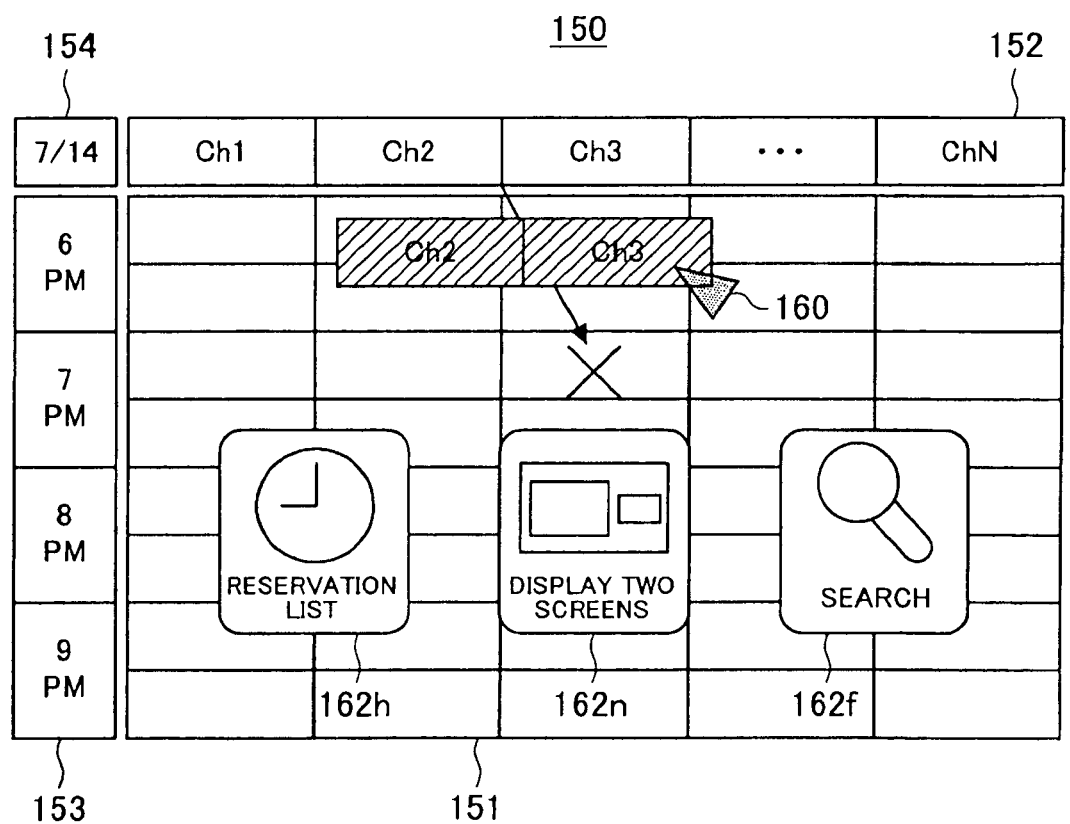
FIG. 19 is an explanatory view exemplifying the screen displayed in the display unit 108 according to the embodiment.

If parts are dropped onto the operation icon 162*h* when displayed as shown in FIG. 18 in the display unit 108, the display unit 108 is caused to display reserved programs from programs broadcast on "Ch 2" and "Ch 3" and if parts are dropped onto the operation icon 162*n*, the display unit 108 is caused by the operation control unit 144 to display video of "Ch 2" and "Ch 3". Thus, by making a plurality of parts selectable, a plurality of parts can be dragged and dropped onto an operation icon simultaneously so that processing such as one-time reservation of a plurality of programs, one-time registration of search conditions, and a two-screen display of broadcasting can be performed. A selected state of a plurality of parts may be made deselectable by selecting the parts again or dropping the parts where no operation icon is present. FIG. 19 is an explanatory view illustrating a case in which the selected state of a plurality of parts is deselected. FIG. 19 illustrates a deselection of the selected state by dropping a plurality of parts in the selected state onto a x mark in FIG. 19 where no operation icon is present. The x mark in FIG. 19 is added for convenience of description and is not displayed in the actual screen of an electronic program guide.

Figure 20:
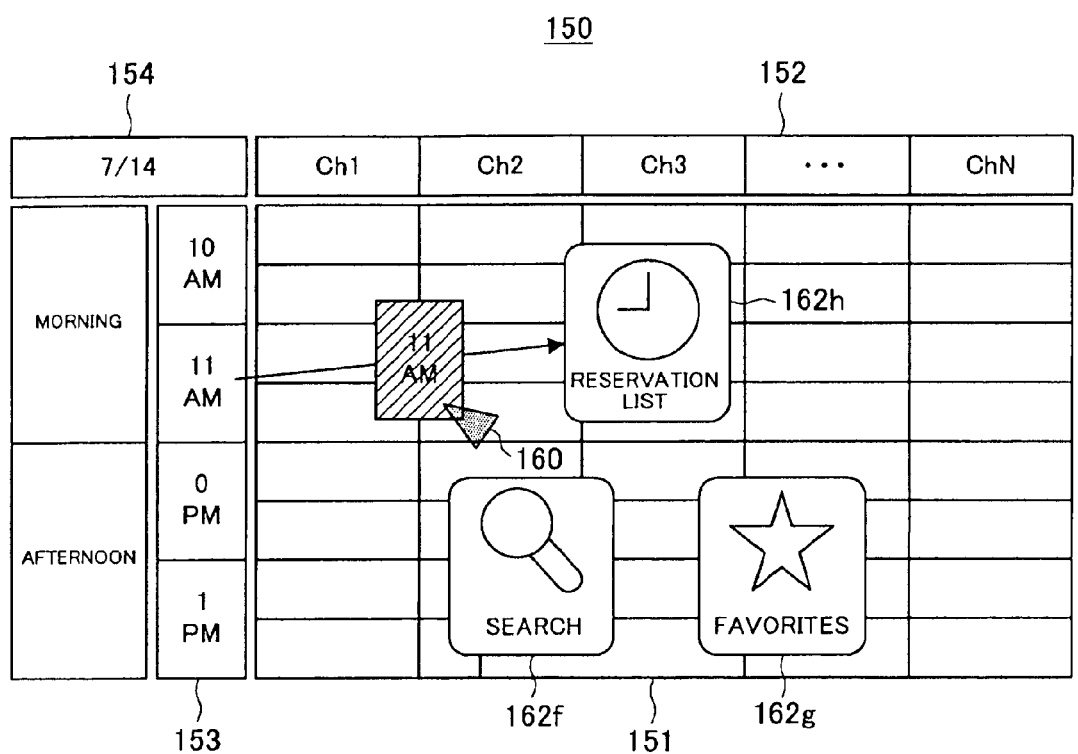
FIG. 20 is an explanatory view exemplifying the screen displayed in the display unit 108 according to the embodiment.

When no operation icon is displayed in the electronic program guide 150, a part in which a time zone or channel is displayed may be selected and dragged to enable operations on programs related to the time zone or channel. FIG. 20 is an explanatory view exemplifying the screen displayed in the display unit 108 when a part in which a time zone is displayed is dragged. In the present embodiment, as shown in FIG. 20, when a part in which the time zone "7 PM" is displayed is selected and dragged, the operation icon 162*h* for displaying a list of reserved programs, the operation icon 162*f* for a search, and the operation icon 162*g* for displaying a list of recommended programs are displayed by the icon display unit 143 by being superimposed on the electronic program guide 150. If, for example, a part in which the time zone "7 PM" is displayed is dropped onto the operation icon 162*h* for displaying a list of reserved programs, the display unit 108 is caused by the operation control unit 144 to display a list of programs set for recording or viewing in the applicable time zone (in this case, 19:00-19:59). Similarly, a part in which a channel is displayed is dropped onto the operation icon 162*h* for displaying a list of reserved programs, the display unit 108 is caused by the operation control unit 144 to display a list of programs, from among programs for which recording or viewing is set, that are broadcast over the applicable channel.

Figure 21:
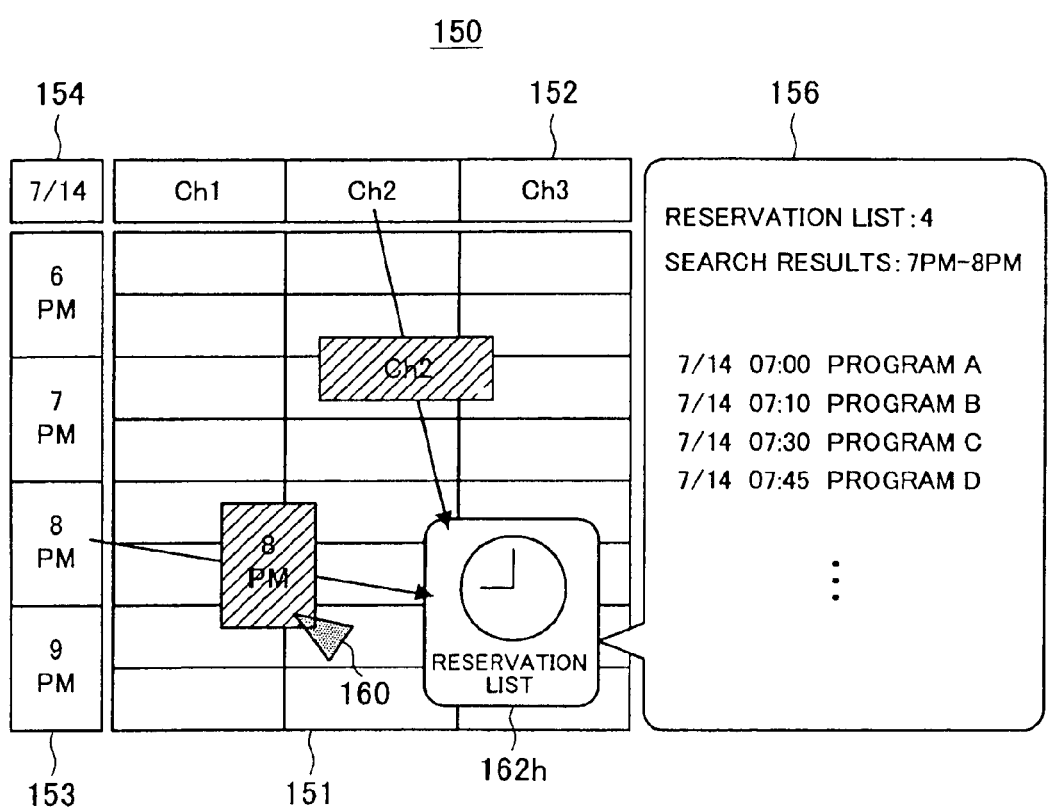
FIG. 21 is an explanatory view exemplifying the screen displayed in the display unit 108 according to the embodiment.

Thus, a list of programs for which recording or viewing is set is displayed in the display unit 108 by dropping a part onto an operation icon, but in this state, a part may further be made draggable and droppable onto an operation icon. FIG. 21 is an explanatory view illustrating a case in which another part is dragged when a list of programs for which recording or viewing is set between 19:00 and 19:59 is displayed in the search result display unit 156. Thus, by dragging another part and dropping the part onto an operation icon, search conditions for programs for which recording or viewing is set can be added.

Figure 22:
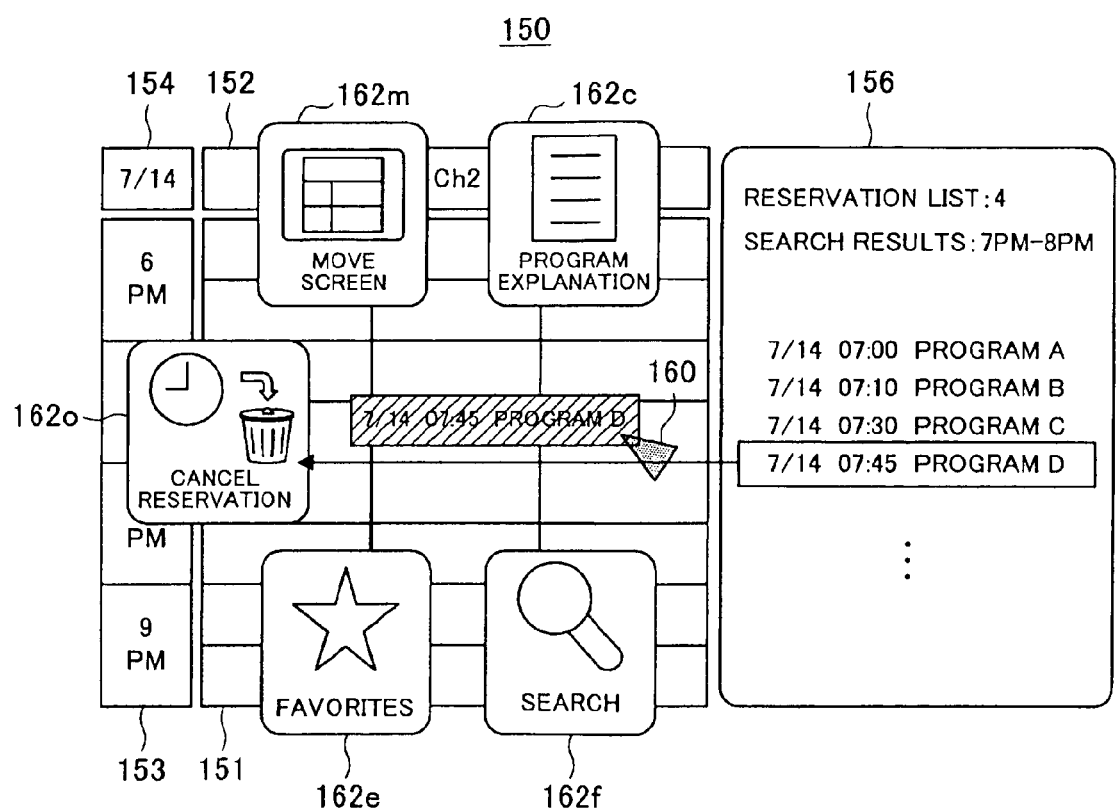
FIG. 22 is an explanatory view exemplifying the screen displayed in the display unit 108 according to the embodiment.

Like the above program search, regarding a list of programs for which recording or viewing is set and displayed in this manner, information displayed in the search result display unit 156 as a search result may also be made a part on which a drag & drop operation can be performed. By making information displayed in the search result display unit 156 also draggable & droppable, various kinds of operations on the information can subsequently be performed. FIG. 22 is an explanatory view illustrating a case in which a program is dragged from a search result of programs for which recording or viewing set displayed in the search result display unit 156 as a part and dropped onto a displayed operation icon. FIG. 22 shows a case in which information displayed as "7/14 07:45 Program D" is selected from information displayed in the search result display unit 156 as a part and dragged. In this case, an operation icon 1620*o* to cancel a reservation is displayed by being superimposed on the electronic program guide 150. A recording setting or viewing setting of a program can be canceled by dragging the applicable part and dropping the part onto the operation icon 162*o* to cancel a reservation.

In the foregoing, operations of the display apparatus 100 according to an embodiment of the present invention have been described. It is needless to say that an electronic program guide displayed in the display unit 108 of the display apparatus 100, positions, the number, and sizes of operation icons, images and words displayed in icons are not limited to those described above.

Operations of the display apparatus 100 may be performed by a control means provided inside the display apparatus 100 by sequentially reading computer programs stored in a storage means (for example, the ROM 111 or the EEPROM 113) inside the display apparatus 100.

[3] Summary

According to an embodiment of the present invention, as described above, information displayed in an electronic program guide is handled as parts and individual parts are made draggable by an operation of the remote controller 130. Then, when a part is dragged, icons related to the part are caused to be displayed by being superimposed on the electronic program guide and the electronic program guide becomes operable by the dragged part being dropped onto a displayed icon. Each part is associated with function icons depending on the appearance or circumstances of the part and thus, the user can perform an intuitive operation based on the appearance of these parts.

When processing not directly related to a focused program such as a program search is performed, it is necessary in the past to input operations in different phases by different operation methods such as first selecting the function by opening the menu and further, setting parameters such as search conditions. In the present embodiment, compared with the above circumstances in the past, even a function that makes such complex condition settings necessary can be executed by repeating a consistent and simple operation such as dragging & dropping a plurality of parts or additionally dropping a part onto an operation icon.

Moreover, according to the present embodiment, operation icons onto which parts are dropped are displayed large near the cursor when a part is dragged and therefore, the user can swiftly perform a drag & and drop operation and also operation errors such as dropping a part erroneously can be reduced.

Further, according to the present embodiment, only by allocating gesture patterns to operation icons, the user can immediately perform an operation related to a part by gesture input while the part being dragged. Since it is not necessary for the user to move the cursor up to an operation icon onto which the part should be dropped and the remote controller 130 needs only to be operated corresponding to the gesture pattern, a swift operation can be performed. There is no need to set many complicated gestures because it is sufficient to have as many gesture patterns as the maximum number of operation icons displayed while a part being dragged. Moreover, operation icons displayed in the screen can be switched by gesture input during dragging or a cursor operation and operations icons that are difficult to display in one screen may be displayed by extension such as the display by category or switching to operation icons for advanced users who are used to operations.

It should be understood by those skilled in the art that various modifications, combinations, sub-combinations and alterations may occur depending on design requirements and other factors insofar as they are within the scope of the appended claims or the equivalents thereof.

In the above embodiment, if, for example, it is difficult to display operations icons at a time, the operation icons are caused to be displayed over a plurality of pages and at this point, operation icons displayed by being superimposed on the electronic program guide 150 may be caused to be displayed in descending order of priority. The order of priority may be decided by, for example, analyzing an operation history of the user so that, as a result of analysis, operation icons more frequently used by the user are displayed in the first page and those less frequently used are displayed in the second page or thereafter.

What is claimed is:

1. A display apparatus, comprising:
display means for displaying images;
electronic program guide display means for causing the display means to display an electronic program guide in a state in which parts are combined;
selection means for draggably and droppably selecting a part of the electronic program guide displayed by the electronic program guide display means;
icon display means for, when the part selected by the selection means is dragged, (i) causing a number of operation icons corresponding to the part to be displayed by being superimposed on the electronic program guide in which each operation icon represents a function currently executable with the part, and (ii) causing an icon or icons representative of a function or functions which are currently set with the part to be changed from that associated with the currently set function or functions to cancel icon or icons each of which enables cancellation of only the respective function such that the icon or icons representative of the function or functions which are currently set are not displayed; and
execution means for, when the part is dropped onto a respective operation icon caused by the icon display means to be displayed by being superimposed on the electronic program guide which represents a respective function currently executable with the part while the part displayed in the electronic program guide being dragged by the selection means, causing the respective function associated with the respective operation icon to be executed,
in which the number of operation icons corresponding to the part which are superimposed on the electronic program guide are displayed thereon after the part is selected and dragged such that the number of operation icons are not displayed thereon prior to the part being selected and dragged.

2. The display apparatus according to claim 1, wherein the selection means moves over the electronic program guide in accordance with movement of a remote control device.

3. The display apparatus according to claim 1, wherein if the selection means moves by drawing a predetermined trajectory while the part of the electronic program guide being dragged by the selection means, the execution means causes the function corresponding to the trajectory to be executed.

4. The display apparatus according to claim 1, wherein the selection means can select a plurality of parts of the electronic program guide simultaneously.

5. The display apparatus according to claim 1, wherein the icon display means decides icons to be displayed by being superimposed on the electronic program guide by using an execution history of the execution means.

6. The display apparatus according to claim 1, wherein if the icons caused to be displayed are not held in the display means, the icon display means causes the display means to display the icons in descending order of priority.

7. The display apparatus according to claim 6, wherein the icon display means decides the priority by using an execution history of the execution means.

8. A display method comprising the steps of:
causing display means for displaying images to display an electronic program guide in a state in which parts are combined;
selecting draggably and droppably the part of the electronic program guide displayed in the electronic program guide display step;
causing, when the part selected in the selection step is dragged, a number of operation icons corresponding to the part to be displayed by being superimposed on the electronic program guide in which each operation icon represents a function currently executable with the part in which the number of operation icons corresponding to the part which are superimposed on the electronic program guide are displayed thereon after the part is selected and dragged such that the number of operation icons are not displayed thereon prior to the part being selected and dragged, and causing an icon or icons representative of a function or functions which are currently set with the part to be changed from that associated with the currently set function or functions to cancel icon or icons each of which enables cancellation of only the respective function such that the icon or icons representative of the function or functions which are currently set are not displayed; and
causing, when the part is dropped onto a respective operation icon caused by the icon display step to be displayed by being superimposed on the electronic program guide which represents a respective function currently executable with the part while the part displayed in the electronic program guide being dragged by the selection step, the respective function associated with the respective operation icon to be executed.

9. A display apparatus, comprising:
display control unit for displaying images including selectable parts;
selection control unit for draggably and droppably selecting a part of the image displayed by the display control unit;
icon display control unit for, when the part selected by the selection control unit is dragged, causing icons corresponding to a function related to the part to be displayed by being superimposed on the image in which the icons are displayed after the part is selected and dragged such that the icons are not displayed prior to the part being selected and dragged; and execution means for, when the dragged part is dropped onto the icon, causing the function associated with the icon to be executed.

10. The display apparatus according to claim 1, wherein the number of operation icons which are superimposed on the electronic program guide such that a portion or portions of the electronic program guide are covered.

11. The display apparatus according to claim 10, wherein the number of operation icons are superimposed on the electronic program guide in an arrangement so as to be near the selected part of the electronic program guide.

\* \* \* \* \*